(12) United States Patent  (10) Patent No.: US 7,435,494 B1
Rogers et al.  (45) Date of Patent: *Oct. 14, 2008

(54) ELECTROCHEMICAL CELL ELECTRODES

(75) Inventors: Darren K. Rogers, Wheeling, WV (US); Janusz Wladyslaw Plucinski, Glen Dale, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/030,889

(22) Filed: Jan. 10, 2005

Related U.S. Application Data

(63) Continuation of application No. 09/888,977, filed on Jun. 25, 2001, now Pat. No. 6,899,970.

(51) Int. Cl.
*H01M 4/96* (2006.01)

(52) U.S. Cl. .................. 429/27; 429/231.8
(58) Field of Classification Search .......... 429/27, 429/40, 231.8, 445, 448, 42, 43; 423/445, 423/448; 264/42, 43; 252/62.2
See application file for complete search history.

(56) References Cited

U.S. PATENT DOCUMENTS

| 5,888,469 | A | * | 3/1999 | Stiller et al. | ............ 423/445 R |
| 5,945,084 | A | * | 8/1999 | Droege | .................... 423/447.4 |
| 6,899,970 | B1 | * | 5/2005 | Rogers et al. | .................. 429/27 |

* cited by examiner

*Primary Examiner*—Patrick Ryan
*Assistant Examiner*—Monique Wills
(74) *Attorney, Agent, or Firm*—Philip D. Lane

(57) ABSTRACT

Coal based carbon foams that are produced by the controlled heating of coal particulate in a mold and under a non-oxidizing atmosphere and subsequently graphitized have been found to provide excellent electrode materials for electrochemical cell applications.

16 Claims, 22 Drawing Sheets

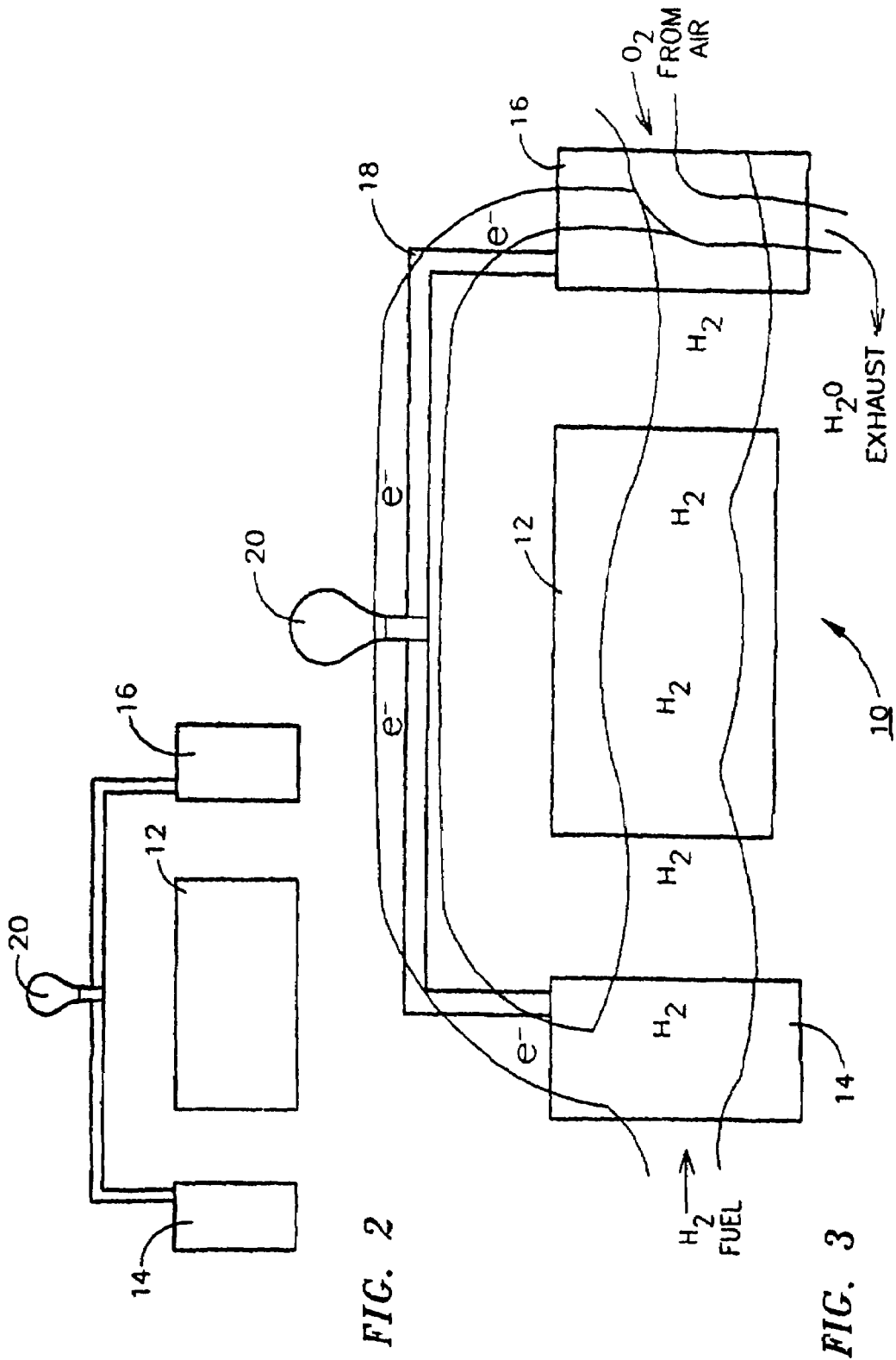

ELECTROCHEMICAL CELL ELECTRODES

CROSS-REFERENCE TO RELATED APPLICATIONS

This application is a continuation of and claims priority to U.S. patent application Ser. No. 09/888,977, filed Jun. 25, 2001 now U.S. Pat. No. 6,899,970, specifically herein incorporated by reference in its entirety.

This invention was made with Government support under N0014-00-C-0062 awarded by the Office of Naval Research. The Government has certain rights in the invention.

FIELD OF THE INVENTION

The present invention relates to electrodes for fuel cells and more particularly to relatively inexpensive carbon foam such electrodes produced from coal.

BACKGROUND OF THE INVENTION

Diminishing supplies of fossil fuels and growing environmental concerns continue to drive research for the development of alternative sources of energy. Each alternative energy source faces the same barriers of cost and efficiency. Fuel cells, based on the conversion of hydrogen fuel and oxygen from the air into electricity, offer unique potential as energy sources, especially for transportation applications. Vehicles powered by fuel cells would have essentially unlimited range because they could be refueled quickly and conveniently.

Only recently has there been significant attention directed to the potential of fuel cells for commercial vehicles. Their efficiency, power density and low emission potential have progressed over the past decade and they are beginning to show potential for zero-emission vehicles. The first fuel cell bus was completed in 1993 and several smaller fuel cell vehicles are now operating in Europe. Beyond transportation, fuel cells have been used to generate electricity in spacecraft, large military naval vessels and prototype power plants. Significant research is ongoing in Canada, Japan, the Netherlands as well as in the U.S. Fuel cells are expected to play an increasingly important role in decreasing fossil fuel dependency and improving air quality.

Fuel cells can operate on a variety of fuels including hydrogen and hydrocarbons such as methanol, ethanol and natural gas. Several fuels cell technologies are being considered, but currently the two most promising technologies for vehicular applications appear to be; 1) proton exchange membrane fuel cells, and; 2) phosphoric acid fuel cells.

In such fuel cells, the chemical energy from oxidation of a gaseous fuel is converted directly to electrical energy. Fuel cells differ from batteries in that reactants are supplied from an external source in fuel cells. The fuel and oxidizing gases are bubbled into separate chambers connected by a porous disk through which an electrolyte such as potassium hydroxide (KOH) can pass. Inert electrodes, often comprised of carbon, mixed with a catalyst such as platinum, are inserted into both chambers. When electrical connection is made between the electrodes and oxidation-reduction reaction takes place, forming water at the anode and liberating electrons upon the oxidation of hydrogen. These electrons migrate to the cathode, where they reduce oxygen.

Gas diffusion electrodes are currently the most important class of electrodes used in fuel cells of his type. The morphology and composition of the electrode material, the mass transport and electrical resistance characteristics of the material in the three phase region, and the distribution of catalysts and surfactants are all of critical importance in such fuel cells. The ability to tailor the electrical conductivity, cell size and connectivity and inertness to alter wetting offer attractive benefits for the use of tailorable carbon foam compositions and structures in such fuel cell applications.

A porous electrode that is inexpensive to produce and readily formed, conducts electricity well, promotes mass transfer of electrolyte and maintains consistent performance over its useful life is the holy grail of fuel cell research. The interest in reducing cost and weight and increasing the efficiency of the processes occurring in fuel cell operation is placing increasingly difficult demands on materials for electrode construction.

Fuel cell electrodes are commonly comprised of sintered metals, woven or non-woven carbon fiber mat or activated carbons. Each of these approaches has shortcomings. Firstly, electrodes base on sintered metals rely on porosity at particle interstices as mass transfer paths. Poor interstitial connectivity results in tortuous paths and reduced electrolyte transfer. Secondly, activated carbons and metals also suffer from changing performance with time. As these electrode materials absorb electrolyte or cell products, their efficiency changes. Carbon xerogels and aerogels are also being considered for electrode usage, but their durability in service and their cost pose significant hurdles. When confined to small spaces such as pores of membranes or porous electrodes or ion channels, electrochemical processes proceed quite differently than in the bulk state. One example of a phenomenon that can be detected in such environments is non-neutrality. Confinement reduces the number of ions in a micropore, and the counter ion concentration is not sufficient to balance the wall charges. Because of capillary and surface forces, flow and transport art quite different in this region than the bulk as well.

Accordingly, there still exists a significant requirement for improved fuel cell electrode materials that do not suffer from the previously described shortcomings.

OBJECTS OF THE INVENTION

It is therefore an object of the present invention to provide a fuel cell electrode materials that is relatively less costly than current electrode materials.

It is another object of the present invention to provide a fuel cell electrode material that demonstrates consistent and reliable performance characteristics over its useful life.

It is yet a further object of the present invention to provide a fuel cell electrode that exhibits excellent mass transfer properties while concurrently being highly inert and resistant the various chemicals present in a typical fuel cell environment.

It is yet another object to provide a fuel cell electrode and material that can be custom designed to optimize the performance of a particular fuel cell chemistry at the micropore level.

SUMMARY OF THE INVENTION

Coal based carbon foams having a density of preferably between about 0.1 g/cm$^3$ and about 1 g/cm$^3$ that are produced by the controlled heating of coal particulate in a mold and under a non-oxidizing atmosphere and subsequently carbonized and graphitized have been found to provide excellent electrode materials for fuel cell applications. Such materials can be easily tailored or custom designed to optimize the performance of the chemical systems of a broad range of fuel cell designs with only minor modification of the fabrication process.

DESCRIPTION OF THE DRAWINGS

FIG. 2 is a schematic depiction of a fuel cell of the type in which the carbon electrodes of the present invention find use.

FIG. 3 is a schematic depiction of the operation of the fuel cell of FIG. 2.

DETAILED DESCRIPTION

Figure 1:
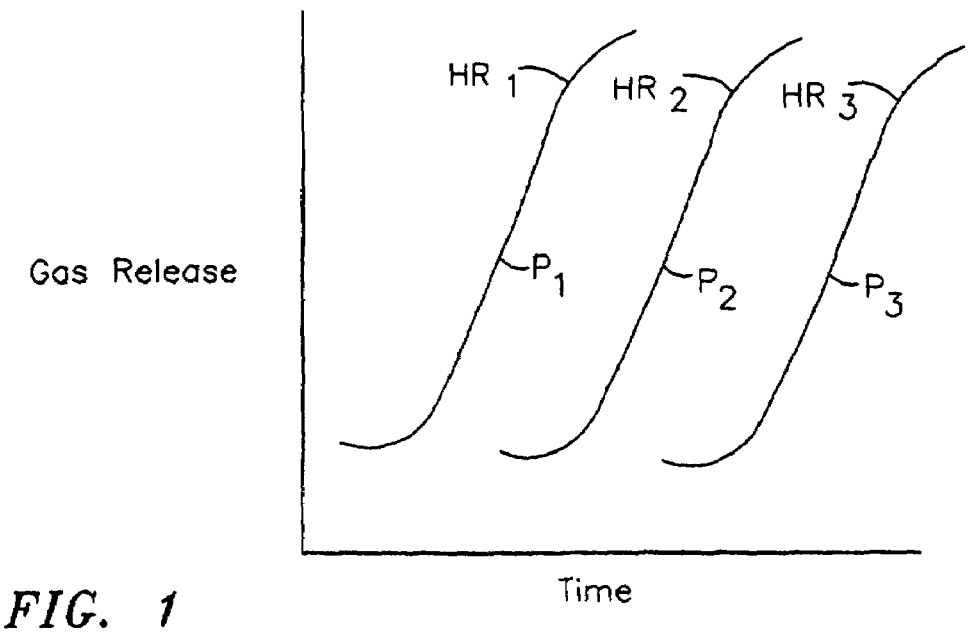
FIG. 1 is a graph of showing the general relationship between gas evolution and time/temperature at various operating pressures and temperatures in the process for the manufacture of carbon foams of the type found useful in accordance with the present invention.

FIG. 2 presents a schematic drawing of a typical fuel cell of the type for which the electrodes of the present invention can be used. Such a fuel cell 10 comprises a solid-state polymer electrolyte membrane 12 having a pair of gas diffusion electrodes 14 and 16 facing each other on opposed planar sides of polymer electrolyte membrane 12. Gas diffusion electrode 14 is designated the fuel electrode or anode while electrode 14 is designated the oxidation electrode or cathode.

As shown schematically in FIG. 3, fuel, in the case shown hydrogen ($H_2$) enters porous anode 14 which may contain an appropriate and well known catalyst, activator or intercalator, migrates selectively through polymer electrolyte membrane 12 as hydrogen ions ($H^+$) and enters porous cathode 16 that may also contain an appropriate catalyst where the hydrogen ions combine with oxygen ($O_2$) from input air to generate electrons or electrical energy ($e^-$) that flow through conductor 18 to power a suitable electrical device 20, in the case depicted a light bulb, and thence though conductor 18 to anode 14 forming a closed electrical circuit. The porous carbon electrodes of the present invention, find application as either or both of anode 14 and cathode 16.

Figure 4:
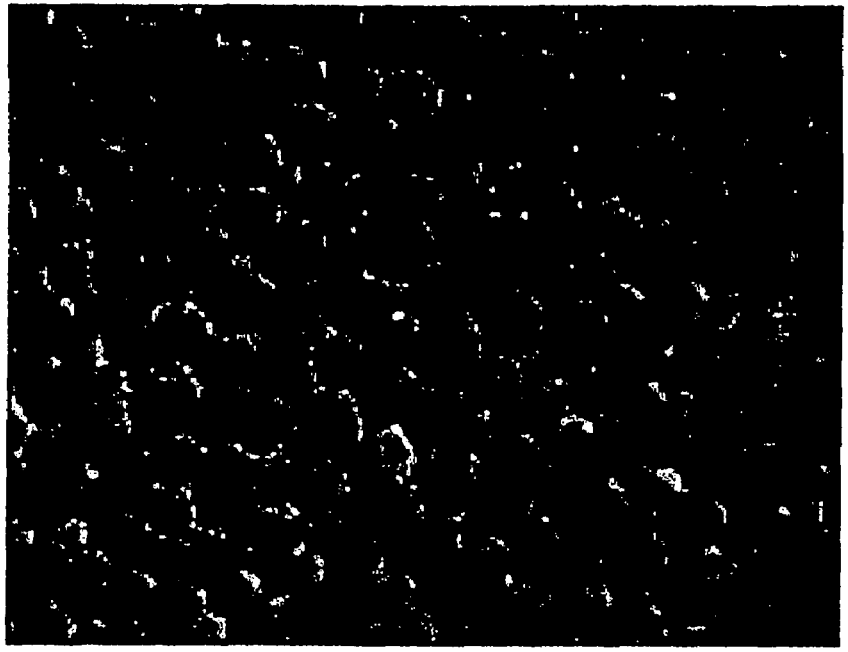
FIGS. 4 and 5 are scanning electron micrographs of reticulated foam as described herein at 10× and 50× magnification respectively.
Figure 5:
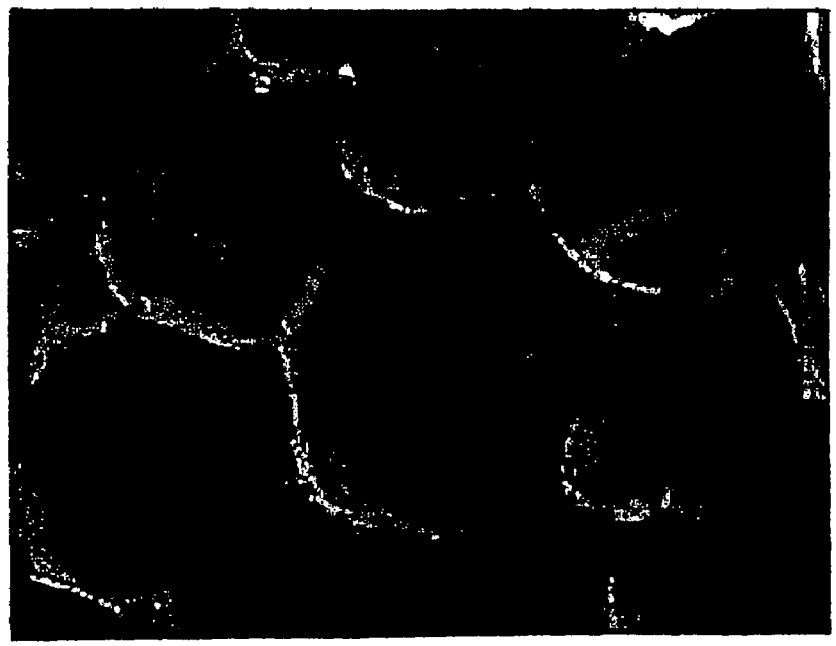
Figure 6:
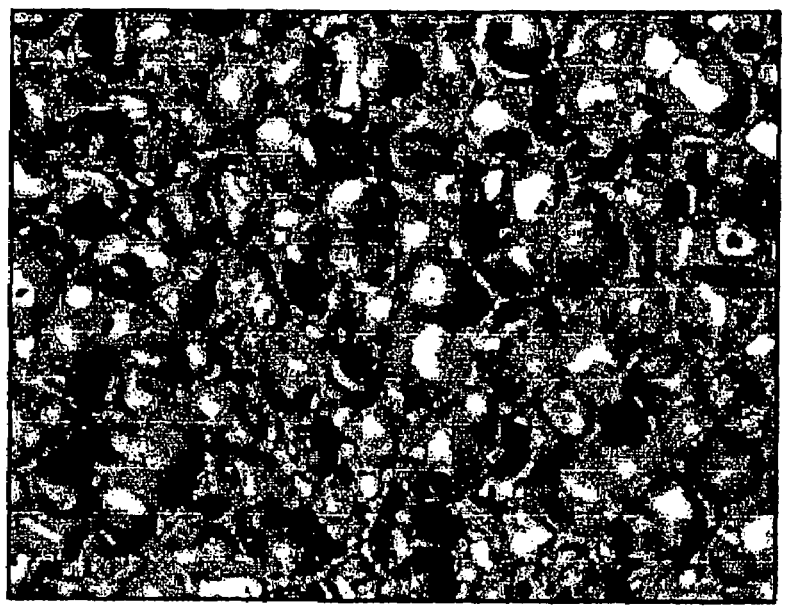
FIGS. 6 and 7 are optical micrographs of cellular and irregular cellular structure respectively at 50× magnification.
Figure 7:
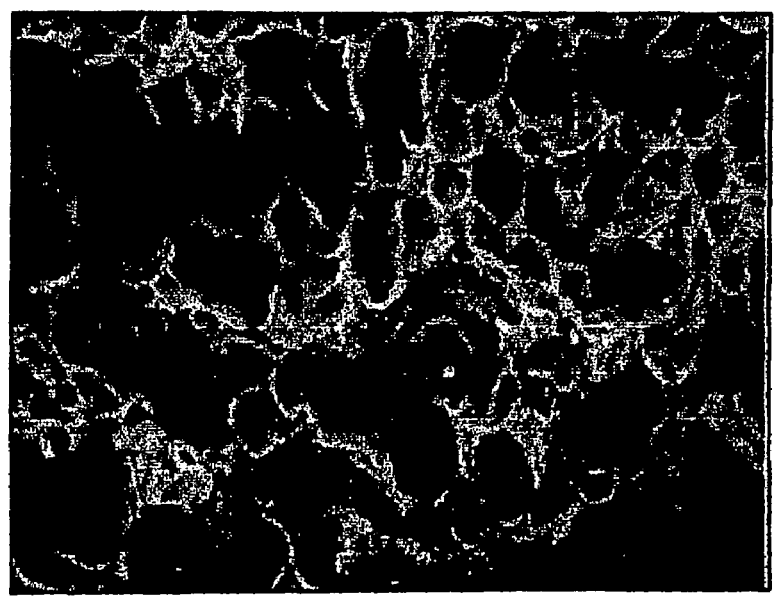
Figure 9:
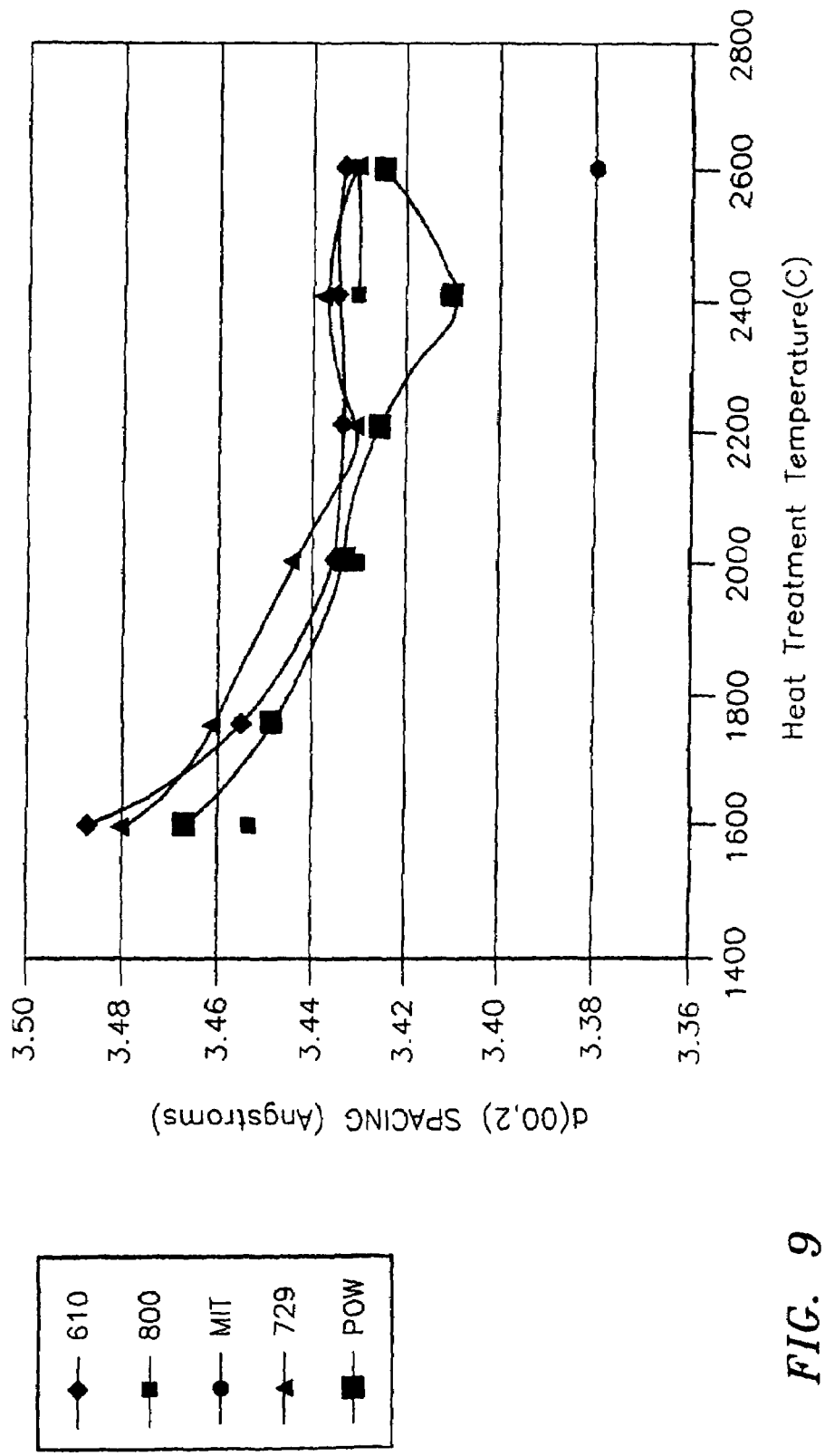
FIG. 9 is a graph showing the interplanar spacing for graphitized coal-based foams.
Figure 10:
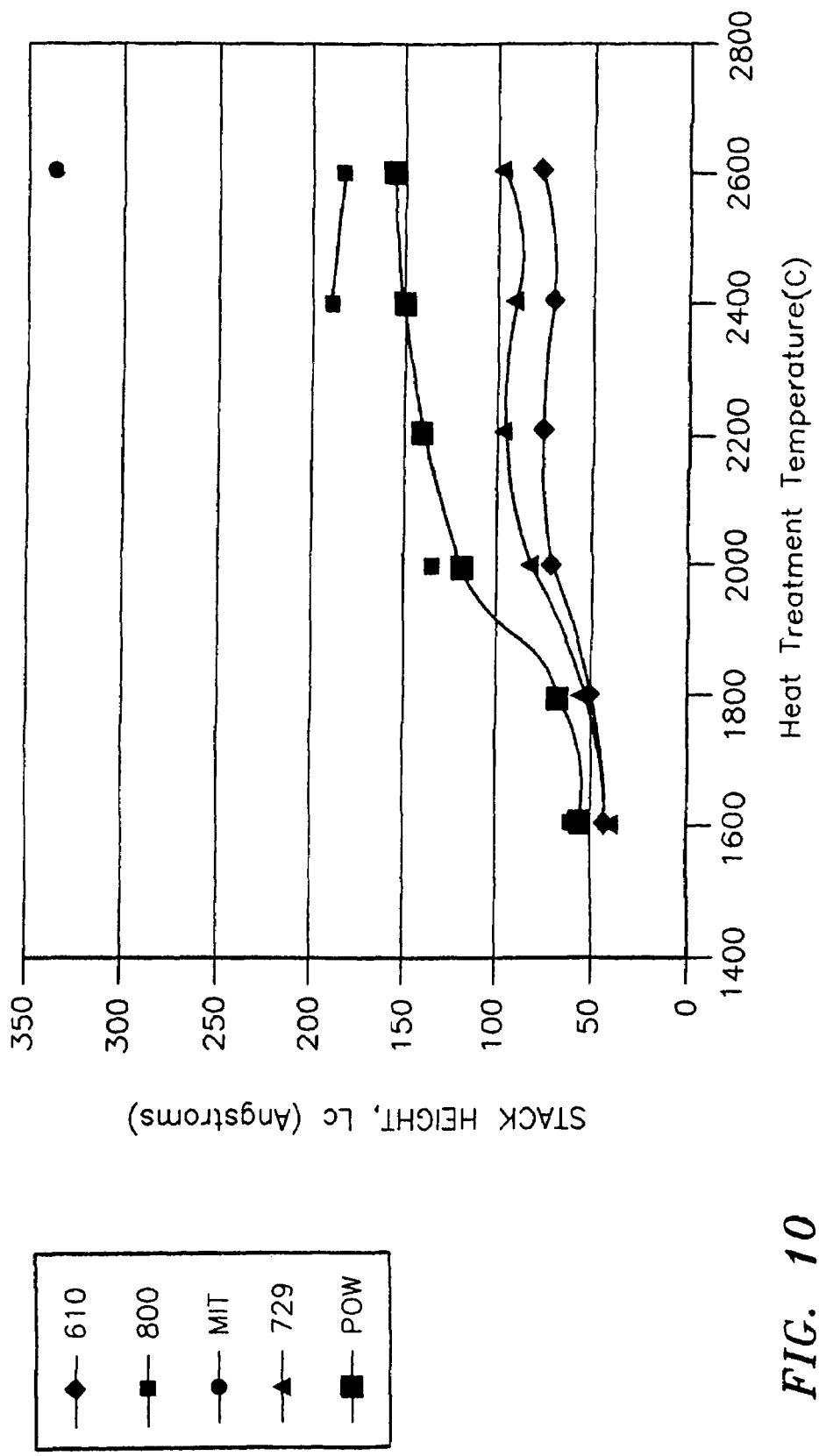
FIG. 10 is a graph showing stack height for graphitized coal-based carbon foams.
Figure 11:
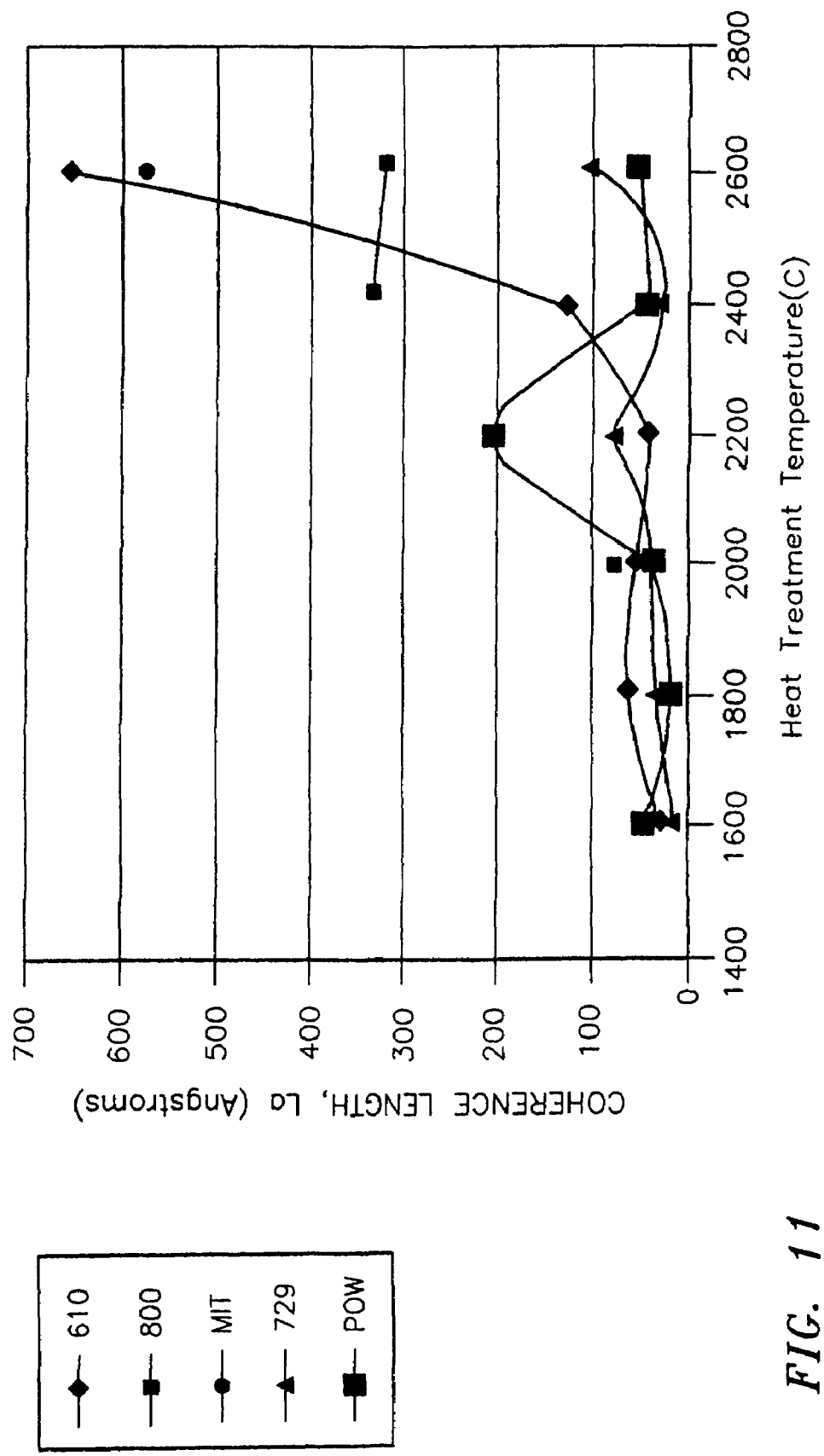
FIG. 11 is a graph of coherence length for graphitized coal-based carbon foams.
Figure 12:
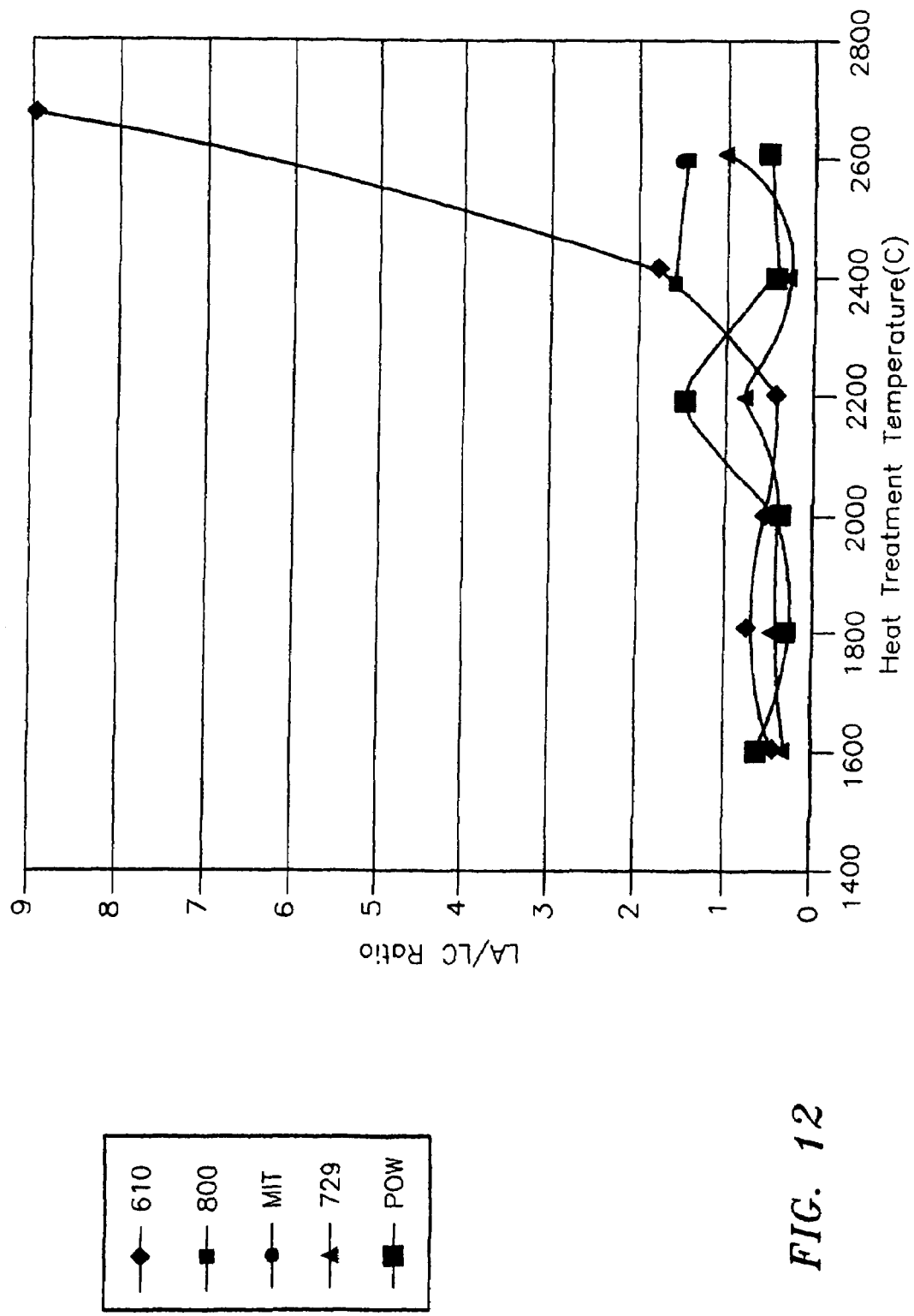
FIG. 12 is a graph showing crystallite aspect ratio for graphitized coal-based carbon foams.
Figure 13:
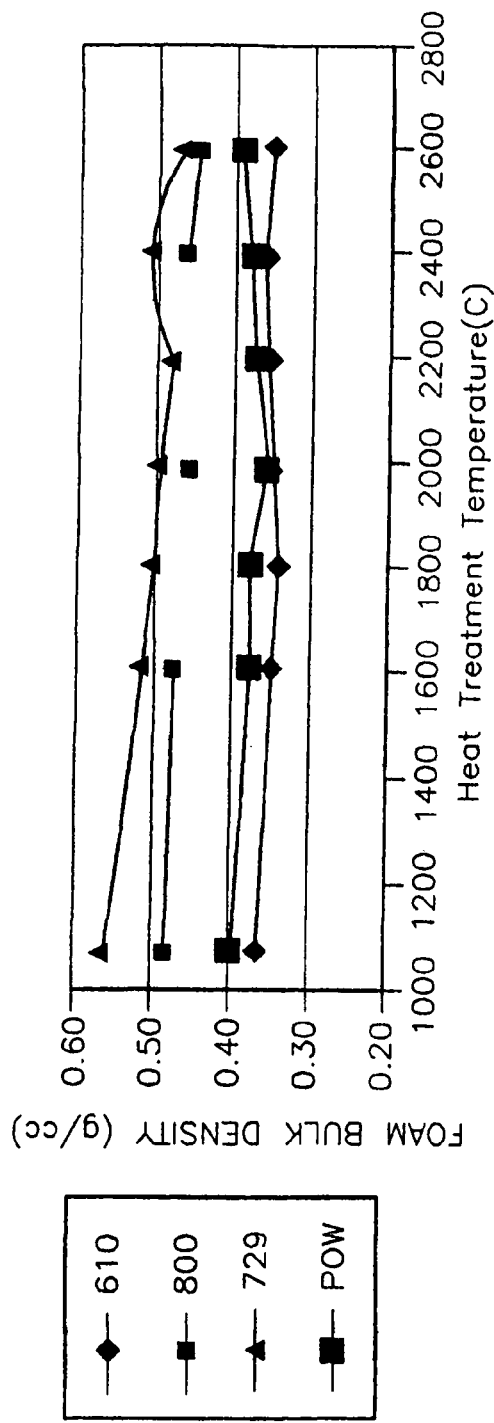
FIGS. 13 through 17 are graphs showing a variety of mechanical properties of graphitized coal-based carbon foams.
Figure 14:
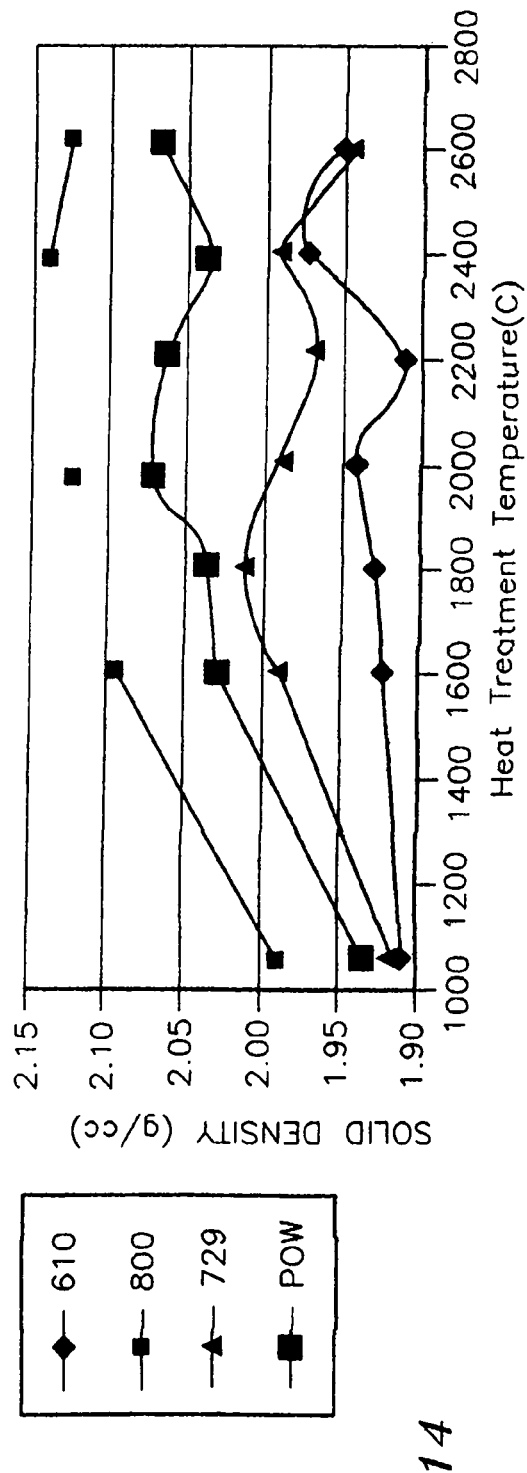
Figure 15:
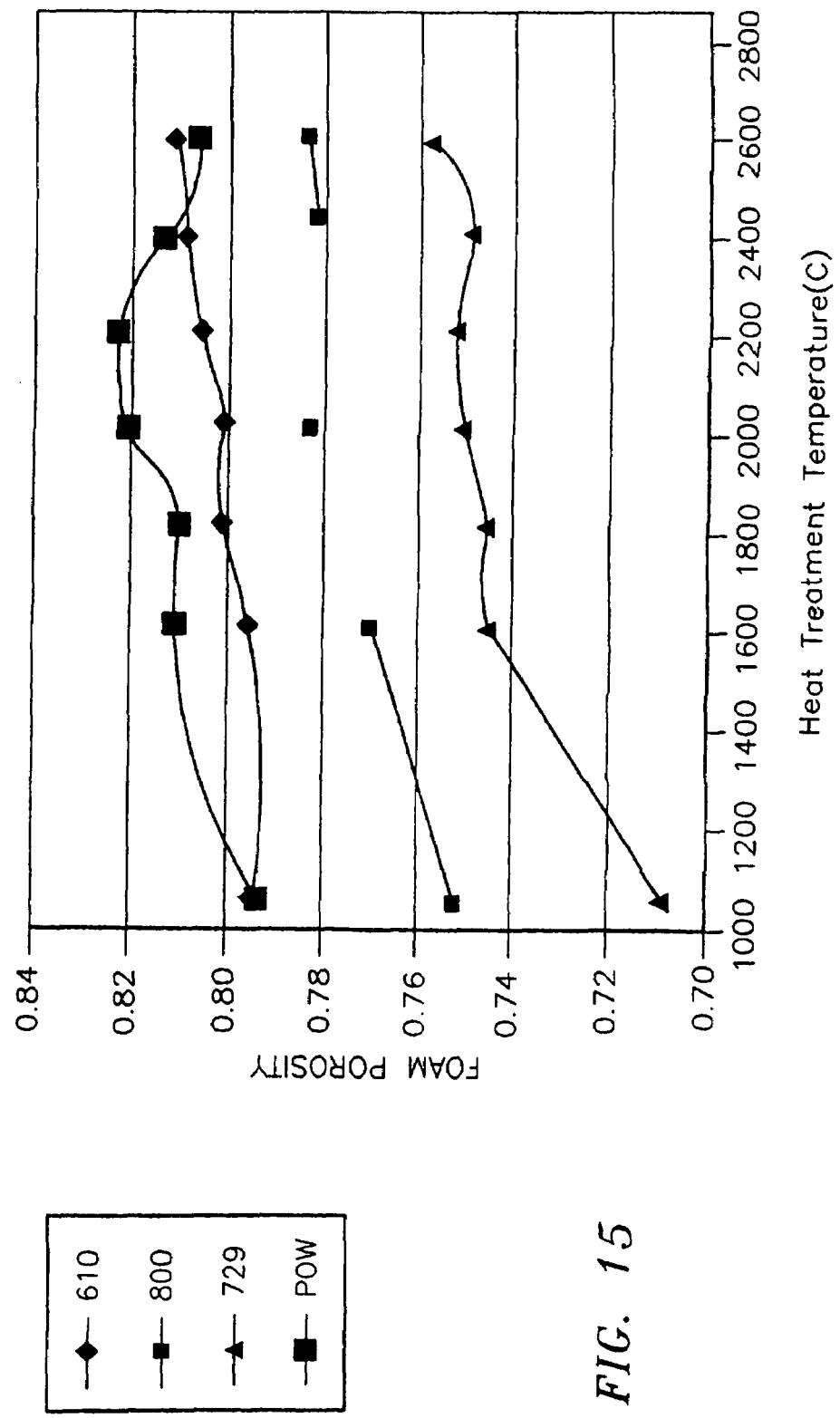
Figure 16:
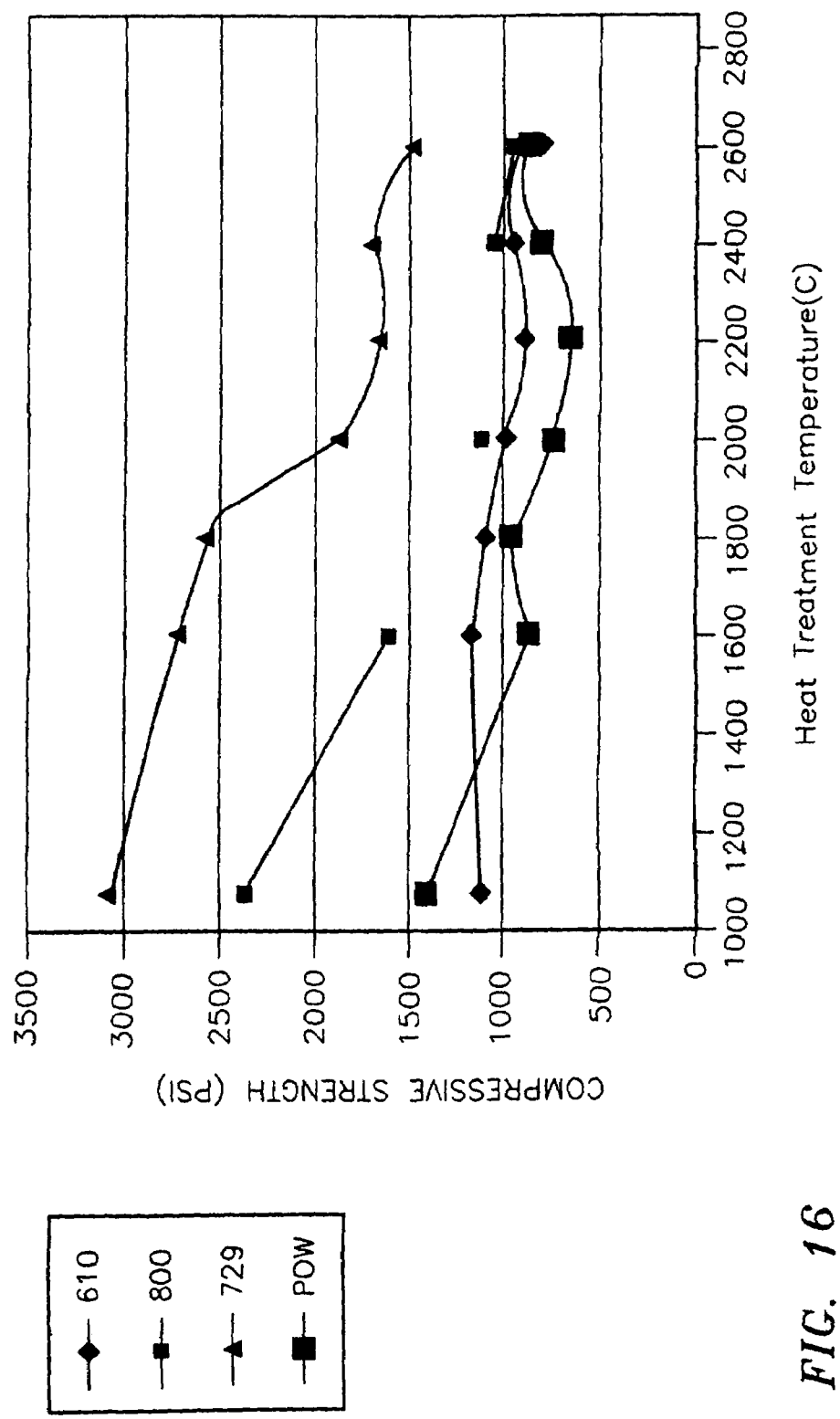
Figure 17:
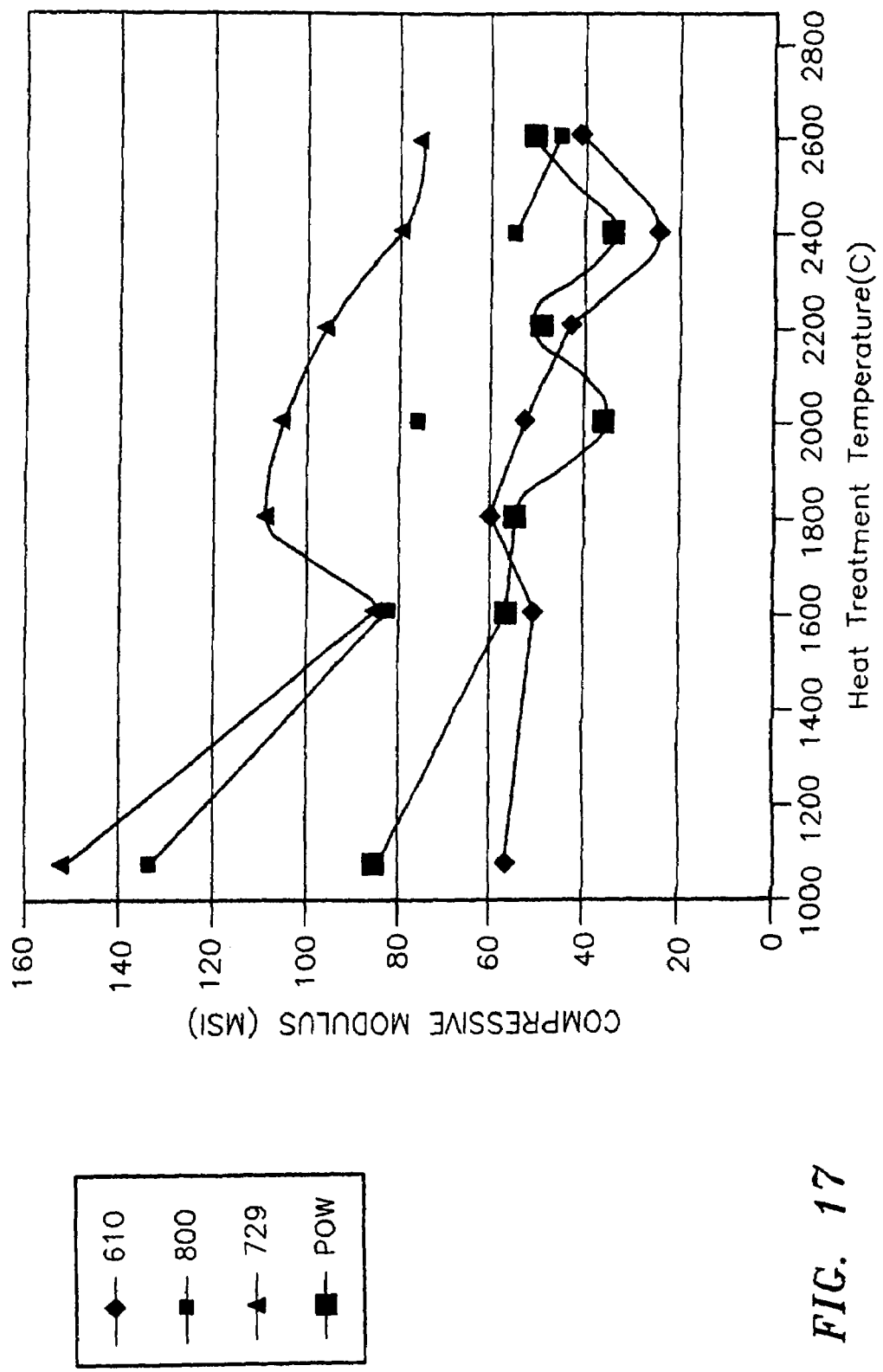

Tailored carbon foams that do not experience performance changes over time due to adsorption/reaction by electrolyte or product species, are relatively inexpensive to produce and highly durable offer a solution to the numerous and perplexing problems described above. Furthermore, the low cost of carbon foams precursors and processing helps to reduce some of the initial cost concerns of fuel cell construction. Additionally, foams having very different cell sizes, cell connectivities, densities and even surface chemistries can be fabricated with only slight process modifications. These can be accentuated by the same activation and intercalation techniques as traditionally used to offer almost unlimited potential for custom electrode property design. Illustrations of the design potential for foams structures described herein are presented in FIGS. 4-7. A very open, reticulated structure is shown in FIGS. 4 and 5. This structure is very similar to that of polymeric or vitreous carbon foams (largely composed of 10 to 15-sided polyhedral that are bounded by solid ligaments). With minor adjustments to the precursor and process conditions as described below, however, foams having a less connected cell structure, such as shown in FIGS. 6 and 7, can be created.

Figure 8:
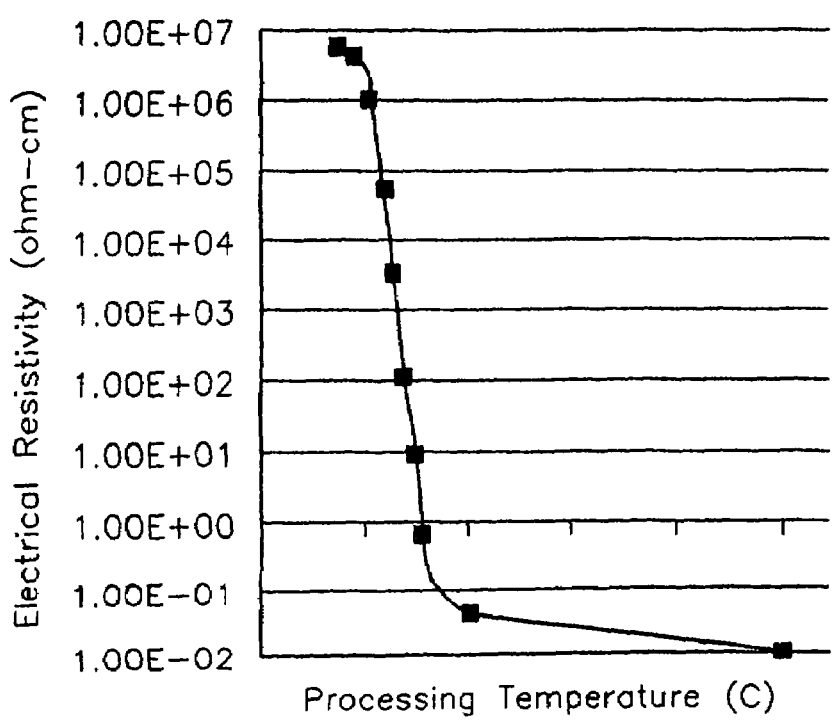
FIG. 8 is a graph showing the electrical resistivity of coal-based carbon foams heat treated to temperatures between about 500° C. and about 2500° C.

The electrical properties and mechanical properties of a given foam structure can be tailored through heat treatment. For a material very similar to that shown in FIG. 7, electrical resistivity can be decreased by almost ten orders of magnitude by heat treatment to high temperatures (between about 500 and 2500° C.) after the foaming process, as illustrated in FIG. 8.

Porous, coal-based, carbon foams that can be produced from inexpensive bituminous coal powders by a controlled coking process provide the foundation for the novel electrodes described herein. As described in greater detail hereinafter, the coal is first foamed in an autoclave. It is then be further heat-treated to further establish its mechanical, thermal, and physical properties. "Green" foams, i.e. foams that have been foamed but not further heat treated, still contain an appreciable quantity of organic matter (e.g., small aliphatic groups) that would ruin their electrochemical performance. When calcined at 1000-1200° C. under inert gas to remove these materials, such foams are essentially 100% carbon, have high electrical conductivity, compressive strength, impact resistance, and low thermal conductivity. Heat treating at higher temperatures, such as above 1700° C. increases graphitic ordering and results in increases in electrical conductivity, thermal conductivity, and elastic modulus. Thus, foam properties can be designed through (1) precursor selection (coal-based starting material), (2) foaming process conditions, and (3) heat treatment conditions. Carbon foams produced by these processes can be machined by conventional methods and require no special tooling or conditions. Graded foams, or foams having designed density gradients through their thickness, have also been developed. This technique may allow the foam to be further tailored to meet localized property requirements.

According to the present invention, a preformed, low density, i.e., from about 0.1 to about 0.8 g/cm³, and preferably from about 0.1 to about 0.6 g/cm³, cellular carbon produced from powdered coal particulate preferably less than about 1 mm in diameter by the controlled heating of the powdered coal in a "mold" under a non-oxidizing atmosphere and subsequently carbonized and graphitized is used as the electrodes in a fuel cell.

The starting material coal may include bitumen, anthracite, or even lignite, or blends of these, but are preferably bituminous, agglomerating coals that have been comminuted to an appropriate particle size, preferably to a fine powder below about −60 to −80 mesh. As used herein, the term "coal-based" is meant to define that the cellular products described herein are prepared or manufactured by the "controlled swelling" of ground or comminuted coal with subsequent carbonization and graphitization procedures applied as required to obtain the required electrical, physical, etc. properties.

The cellular coal-based carbon foams described herein are semi-crystalline or more accurately turbostratically-ordered and largely isotropic i.e., demonstrating physical properties that are approximately equal in all directions. These coal-based cellular carbon foams typically exhibit pore sizes on the order of less than 100μ, although pore sizes of up to 2000μ are possible within the operating parameters of the process described. The thermal conductivities of the coal-based carbon foams are generally less than about 1.0 W/m/° K. Typically, the coal-based carbon foams used in accordance with the present invention demonstrate compressive strengths on the order of from about 2000 to about 4000 psi at densities of from about 0.4 to about 0.5 g/cm$^3$.

The production method of the coal-based, carbon foams utilized as fuel cell electrodes as described herein comprises: 1) heating a coal particulate of preferably small i.e., less than about 1 mm particle size in a "mold" and under a non-oxidizing atmosphere at a heat up rate of from about 1 to about 20° C./min. to a temperature of between about 300 and about 700° C.; 2) soaking at a temperature of between about 300 and 700° C. for from about 10 minutes up to about 12 hours to form a preform or finished product; and 3) controllably cooling the preform or finished product to a temperature below about 100° C. The non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

It is generally not desirable that the reaction chamber be vented or leak during the heating and soaking operation. The pressure of the chamber and the increasing volatile content therein tends to retard further volatilization while the cellular product sinters at the indicated elevated temperatures. If the furnace is vented or leaks during soaking, an insufficient amount of volatile matter may be present to permit inter-particle sintering of the coal particles thus resulting in the formation of a sintered powder as opposed to the desired cellular product. Thus, according to a preferred embodiment of the present process, venting or leakage of non-oxidizing gas and generated volatiles is inhibited consistent with the production of an acceptable carbon foam product.

Additional more conventional blowing agents may be added to the particulate prior to expansion to enhance or otherwise modify the pore-forming operation.

The term "mold", as used herein is meant to define a mechanism for providing controlled dimensional forming of the expanding coal. Thus, any chamber into which the coal particulate is deposited prior to or during heating and which, upon the coal powder attaining the appropriate expansion temperature, contains and shapes the expanding porous coal to some predetermined configuration such as: a flat sheet; a curved sheet; a shaped object; a building block; a rod; tube or any other desired solid shape can be considered a "mold" for purposes of the instant invention. Mold materials include glass and ceramics as well as aluminum and steel. As will be explained more completely below, the selection of mold material and consequently heating/volitization rates can affect cell formation and product properties and is consequently an important consideration in the production of the foams used as fuel cell electrodes.

As will be apparent to the skilled artisan familiar with pressurized gas release reactions, as the pressure in the reaction vessel, in this case the mold, increases from 0 psi to 500 psi, as imposed by the non-oxidizing gas, the reaction time will increase and the density of the carbon foam will increase as the size of the "bubbles" or pores produced in the expanded coal decreases. Similarly, a low soak temperature at, for example about 400° C. will result in a larger pore or bubble size and consequently a less dense expanded foam than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce carbon foams in a wide variety of controlled densities, strengths etc. These results are graphically represented in FIG. 1 where the X axis is gas release, the Y axis is time and the individual curves represent different pressures of inert gas $P_1$, $P_2$, and $P_3$, different heat-up rates $HR_1$, $HR_2$, and $HR_3$, and $P_1<P_2<P_3$ and $HR_1<HR_2<HR_3$.

Cooling of the preform or carbon foam product after soaking is not particularly critical except as it may result in cracking of the preform or product as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is in no way critical.

After expanding the coal particulate as just described, the carbon foam product is an open celled material. Several techniques have been developed for "sealing" the surface of the open celled structure to improve its adhesive capabilities for further fabrication and assembly of a number of parts. For example, a layer of a commercially available graphitic adhesive can be coated onto the surface and cured at elevated temperature or allowed to cure at room temperature to provide an adherent skin. Alternatively, the expansion operation can be modified by cooling the carbon foam or preform rapidly, e.g., at a rate of 10° C./min or faster after expansion. It has been discovered that this process modification results in the formation of a more dense skin on the carbon which presents a closed pore surface to the outside of the preform. At these cooling rates, care must be exercised to avoid cracking of the preform.

After expanding, the coal-based carbon foam preform is readily machineable, sawable and otherwise readily fabricated using conventional fabrication techniques.

Subsequent to production of the carbon foam as just described, it is subjected to carbonization and/or graphitization according to conventional processes to obtain particular properties desirable for specific application as a fuel cell electrode. Activation, for example, by ozone or carbon dioxide, may also be performed, if activation of the coal-based expanded carbon foam product would be useful in certain fuel cell applications. Additionally, a variety of additives and structural reinforcers may be added to the carbon foam either before or after expansion to enhance specific mechanical properties such as fracture strain, fracture toughness and impact resistance. For example, particles, whiskers, fibers, plates, etc. of appropriate carbonaceous or ceramic composition can be incorporated into the carbon foam to enhance its mechanical properties.

The cooling step in the expansion process results in some relatively minimal shrinkage on the order of less than about 5% and generally in the range of from about 2% to about 3%. This shrinkage must be accounted for in the production of ear net shape carbon foams of specific dimensions and is readily determinable through trial and error with the particular coal starting material being used. The shrinkage may be further minimized by the addition of some inert solid material such as coke particles, ceramic particles, ground waste from the coal expansion process etc. as is common practice in ceramic fabrication.

Carbonization is conventionally performed by heating the coal-based, carbon foam prepared as just described, under an appropriate inert gas at a heat-up rate of less than about 5° C. per minute to a temperature of between about 800° C. and about 1200° C. and soaking for about 1 hour or less. Appropriate inert gases are those described above that are tolerant of these high temperatures. The inert atmosphere is supplied at a pressure of from about 0 psi up to a few atmospheres. The carbonization process serves to remove all of the non-carbon elements present in the preform or product such as sulfur, oxygen, hydrogen, etc.

Graphitization, commonly involves heating the carbon foam either before or after carbonization at heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

Coals suitable for use in the processes described herein are primarily bituminous coals exhibiting a "swell index" as determined by ASTM standards DD5515-97, "Standard Test Method for the Determination of Swelling Properties of Bituminous Coal" and D720-91 "Standard Test Method for Free Swelling Index of Coal" of between about 3 and about 9 and preferably about 4. Best results are achieved in terms of adequate cell generation to obtain coal-based cellular materials of the proper densities when the bituminous coal demonstrates a Gieseler plasticity value commonly characterized as high, i.e. above about 500 DDPM. Such values are determined in accordance with ASTM standard D-2639. Agglomerating bituminous coals, i.e. those containing from about 10 to about 32% by weight volatiles are specifically preferred.

The carbon foams resulting from processing in accordance with the foregoing procedures are optimally useful as fuel cell electrodes as described below.

As already alluded to, the coal-based, carbon foams can be produced in any solid geometric shape. Such production is possible using any number of modified conventional processing techniques such as extrusion, injection molding, etc. In each of such instances, the process must, of course, be modified to accommodate the processing characteristics of the starting material coal. For example, in extruding such products, as described below, the coal powder starting material is fed by an auger into an expansion chamber where it is expanded and from which it is extruded while still viscous. Upon exiting the extrusion die, the material is cooled to provide a solid shape of the desired and precalculated dimensions. To improve the efficiency, i.e., cycle time of the process, the input material can be preheated to a temperature below the expansion point, e.g., below about 300° C., fed into the auger chamber where additional heat is imparted to the powder with final heating being achieved just before extrusion through the die.

Similar relatively minor process modifications can be envisioned to fabricate the carbon foams of the present invention in injection molding, casting and other similar conventional material fabrication processes.

Foams prepared as just described are very different than their natural graphite, coke, and mesophase microbead cousins—and even competitive carbon foams—in several important ways. Unlike natural graphite, such foams are harder and more durable owing to that fact that they are comprised of finer crystallites that are randomly oriented. Thus, they are not likely to degrade structurally or exfoliate during service, as does natural graphite, even in the presence of aggressive electrolytes, such as propylene carbonate. Coke products are similar in that they are produced from petroleum or coal feedstocks. However, cokes have low capacity and can contain significant amounts of impurities, like sulfur, hydrogen, and ash, which interact deleteriously with metal ions and electrolyte to create unwanted half-cell reactions. While they can be porous and hard like the porous coal-based foams described herein, coke structure and uniformity is not controlled—and cannot be designed, as can that of the instant materials. Cleaning the raw coal before foaming, designing the cellular structure during the foaming process, and heat treating the foam to a higher temperature than coke to remove sulfur and hydrogen, provides coal-based foams that offer significant anode performance benefits over coal at nearly as low a price. High quality pitch-based microbeads and foams can offer additional performance benefits and design potential, but these materials cannot approach the low cost of foamed coal residues. Thus, if plotted on a line chart, the performance and cost of these potential anode materials might be represented as performance (poor) coke coal-based foam mesophase microbeads (excellent)

cost (low)coke coal-based foam mesophase microbeads (high)

The invention will be better understood when considered in light of the following, non-limiting examples of its implementation.

EXAMPLES

Example 1

Coal-based, carbon foam fuel cell electrodes were produced from four different coal precursors and heat-treated them at several different graphitization temperatures for initial evaluation in fuel cell applications. An additional foam article, produced from a high-purity (and expensive) synthetic pitch, and heat treated to a very high temperature, was also included for comparison. A description of the four coals and one pitch employed in this study is presented in Table 1.

TABLE 1

Descriptions of coals included in this evaluation

| ID | Coal ID | Seam | Comments | |
|---|---|---|---|---|
| A | 610 | Elkhorn | Pike County | Stoker, High-Vol. |
| B | 729 | Coalburg | Wayne County | Washed, Deep Mine, High-Vol |
| C | 900 (POW) | Powellton | Powellton Country | High-Volatile |
| D | 800 | Sewell | McDowell County | Stoker, Low-Vol. |
| M | N/A | N/A | Mitsubishi ARA24 Resin (synthetic mesophase from naphthalene) | |

The four coals were characterized by (1) constituent analysis, (2) ultimate analysis, (3) free-swell index (in accordance with ASTM D720), and (4) Gieseler plasticity (in accordance with ASTM D2639). These data are summarized in Table 2.

TABLE 2

Summary of analytical data for 610, 729, POW, and 800 coals

| | Material => | 610 | 729 | POW | 800 |
|---|---|---:|---:|---:|---:|
| Constituent Analysis | % Total Moisture | 2.50 | 4.79 | 1.36 | 4.48 |
| | % Ash (A/R) | 9.00 | 9.19 | 7.35 | 7.50 |
| | % Ash (D/B) | 9.23 | 9.65 | 7.45 | 7.85 |
| | % Sulfur (A/R) | 1.23 | 0.84 | 0.89 | 0.64 |
| | % Sulfur (D/B) | 1.26 | 0.88 | 0.90 | 0.67 |
| | BTU/lb (A/R) | 13,226 | 12,757 | 14,103 | 13,851 |
| | BTU/lb (D/B) | 13,565 | 13,399 | 14,298 | 14,501 |
| | MAFBTU | 14,945 | 14,830 | 15,448 | 15,736 |
| Free Swelling Index | | 4 | 4 | 4 | 9 |
| Ultimate Analysis | % Carbon (D/B) | 71.03 | 74.99 | 84.09 | 82.61 |
| | % Hydrogen (D/B) | 5.24 | 5.25 | 5.30 | 4.40 |
| | % Nitrogen (D/B) | 1.38 | 1.35 | 2.44 | 1.07 |
| | % Ash (D/B) | 9.23 | 9.65 | 0.50 | 7.85 |
| | % Sulfur (D/B) | 1.26 | 0.88 | 0.82 | 0.67 |
| | % Oxygen (D/B) | 11.86 | 7.88 | 6.85 | 3.40 |
| Gieseler Plasticity | Max Fluidity (ddpm) | 2,080 | 227 | 4,618 | 132 |
| | Max Fluidity Temp (C.) | 430 | 439 | 456 | 474 |
| | Initial Softening Temp (C.) | 390 | 397 | 395 | 437 |
| | Solidification Temp (C.) | 458 | 460 | 495 | 496 |
| | Plastic Range (C.) | 68 | 63 | 100 | 59 |

Example 2

Foaming

Carbon foam test articles were fabricated by foaming (thermally decomposing under controlled temperature and pressure conditions to produce cellular material of uniform density) and calcining (heat treating in an inert atmosphere to remove aliphatic material from the carbon structure) bituminous coal powders. Foaming took place in reactors manufactured by Parr Instruments (Moline, Ill.) at temperatures between 425 and 550° C. and nitrogen pressures between 0 (ambient) and 500 psi. Two identical Model 4570 high-pressure reactors, with 600° C. temperature and 3000 psi pressure service capabilities, were used in this evaluation.

Two hundred grams of material were used to produce each article, and the articles were formed in a 6061 aluminum can 5.0-inches in diameter by 6.0-inches in height. The process employed for foam article production was as follows.

Load reactor with container filled with 200 grams of −60 mesh coal powder,

Seal reactor by tightening sixteen (16) set screws in star pattern to 30 ft-lbs in four cycles (one at 10 ft-lbs, one at 20 ft-lbs, and two at 30 ft-lbs) using a torque wrench, pressurize system to at least 100 psi nitrogen, vent reactor to 0 psi, pressurize reactor and ballast tanks to the desired operating pressure for the experiment (0 to 500 psi), seal-off gas supply tanks, retaining connection between reactor and ballast tanks to moderate pressure excursions during operation, start heating profile, which includes five steps heat at 2.5° C. per minute from ambient temperature to 325° C., soak at 325° C. for one hour, heat at 2.0° C. per minute from 325° C. to the ultimate temperature (between 450 and 550° C., dependent upon the maximum fluidity temperature of the coal), soak at the ultimate temperature for seven hours, and cool from the ultimate temperature to 25° C. at an uncontrolled rate, vent the reactor when temperature was between 50 and 100° C., and loosen bolts by reversing the tensioning procedure at 30+ ft-lbs torque and remove the containers.

Example 3

Calcining

All articles were calcined to 1050° C. by loading foam articles into a 304 stainless steel can and surrounding the articles with granulated coke breeze (Loresco Earth Backfill). The coke breeze served two purposes: (1) it increased thermal mass of the system to minimize temperature excursions and influence of heating element cycling, and (2) it scavenged oxygen from the furnace atmosphere. The calcining cycle was as follows.

heating from ambient temperature to 1050° C. at a heating rate of 1.0° C. per minute, remaining at 1050° C. for two to three hours, and cooling at an uncontrolled rate (furnace power turned off).

A summary of the mass losses, shrinkages, densities, and compressive strength/modulus properties for the different coal precursors at the as-foamed ("green") and calcined stages is presented in Table 3.

TABLE 3

Summary of foaming and calcining data for coal precursors

| Parameter | Precursor | | | | Summary | | |
|---|---|---|---|---|---|---|---|
| | 610 | 729 | POW | 800 | average | maximum | minimum |
| Foaming Temperature (C.) | 450 | 500 | 500 | 550 | 500 | 450 | 550 |
| Foaming Pressure (psi) | 500 | 500 | 500 | 500 | 500 | 500 | 500 |
| Foaming Mass Loss (%) | 17.12% | 20.39% | 13.90% | 10.16% | 15.39% | 10.16% | 20.39% |
| "Green" Foam Bulk Density (g/cc) | 0.3740 | 0.3814 | 0.3857 | 0.3787 | 0.3800 | 0.3740 | 0.3857 |
| "Green" Foam Strength (psi) | 308 | 460 | 752 | 1,009 | 632 | 308 | 1,009 |
| "Green" Foam Modulus (ksi) | 22 | 32 | 39 | 50 | 36 | 22 | 50 |
| Calcining Temperature (C.) | 1050 | 1050 | 1050 | 1050 | 1050 | 1050 | 1050 |
| Calcining Mass Loss (%) | 18.12% | 13.49% | 11.62% | 9.95% | 13.30% | 9.95% | 18.12% |
| Total Mass Loss (%) | 32.14% | 31.13% | 23.91% | 19.10% | 26.57% | 19.10% | 32.14% |
| Calcined Foam Bulk Density (g/cc) | 0.4569 | 0.4887 | 0.4974 | 0.4707 | 0.4784 | 0.4569 | 0.4974 |
| Calcining Shrinkage (%, linear) | 11.97% | 10.85% | 11.38% | 9.43% | 10.91% | 9.43% | 11.97% |
| Calcined Foam Strength (psi) | 1,349 | 1,512 | 2,393 | 2,431 | 1,921 | 1,349 | 2,431 |
| Calcined Foam Modulus (ksi) | 103 | 77 | 126 | 89 | 99 | 77 | 126 |

Example 4

Graphitization

Calcined foam articles, nominally 5.0-inches in diameter and less than 3.0-inches in thickness, were quartered so that they would fit in the chamber of a Thermal Technologies "Astro" graphite resistance furnace for graphitization. A sample of each of the coal foams was stacked in the vertical cylindrical hot zone (approximately 30-inches diameter by 6.0-inches length) of the furnace, atop a graphite hearth and separated by flexible graphite foils. The graphitization process was performed as follows:

- carbon foam samples loaded into hot zone and furnace sealed by means of three knurled screws,
- furnace shell water cooling system started,
- furnace evacuated by roughing pump and then pressurized with helium to 2 to 5 psi gage pressure (this cycle is repeated three times),
- furnace filled to 2 to 5 psi helium,
- heating profile started, with heating rate set at 20° C. per minute to an ultimate temperature selected from 1800, 2000, 2200, 2400, and 2600° C.,
- furnace held at ultimate temperature for 30 minutes,
- furnace turned off and allowed to cool without a controlled rate, and
- furnace pressure vented and samples removed.

Specimens at least 2.0-cm in diameter and 1.0-cm in thickness from each precursor/heat treatment combination were subjected to voltammetry and other characterization. Remnant specimens were subjected to (1) X-ray diffraction analysis, (2) mechanical testing, and (3) physical testing to determine the effects of high temperature treatment on these different materials. These data are summarized below.

Example 5

Carbon Foam Mechanical and Physical Properties

Sample Preparation and Identification

The four coals for which the structural changes that occur during graphitization were studied were labeled as follows:
- A=610 coal,
- B=729 coal,
- C=POW coal, and
- D=800 coal.

For each coal, samples heat-treated to different ultimate temperatures are noted as
- 1=1600° C.,
- 2=1800° C.,
- 3=2000° C.,
- 4=2200° C.,
- 5=2400° C., and
- 6=2600° C., with the exception of lot D (800 coal), for which less calcined foam was available. For lot D, then, the samples are noted as
- 1=1600° C.,
- 2=2000° C.,
- 3=2400° C., and
- 4=2600° C.

Thus, sample A1 was 610 coal foam graphitized to 1600° C. and sample C5 was POW coal foam graphitized to 2400° C. Foam made from Mitsubishi ARA24 resin graphitized to 2600° C. was labeled Lot M.

X-Ray Diffraction

Wide angle X-ray diffraction (copper $K_\alpha$ radiation) was employed to study the crystal structure of the graphitized foams. The raw intensity versus Bragg angle scans were studied and analyzed according to commonly accepted methods.

The interplanar spacing, or spacing between the (00,2) crystal planes for graphite, is an important descriptor of crystal order. This spacing is 3.44 Angstroms for "turbostratic," or disordered graphite with random (00,2) plane orientation, and 3.354 Angstroms for perfectly ordered graphite, with an ABAB stacking sequence. Values of d(00,2) values higher than that of disordered graphite are possible—with strain, heteroatom inclusion, etc.

Crystallite size can also be calculated from the breadth of multiple orders of the same reflections (peaks), after separation of instrumental and strain broadening terms, and application of Scherrer's Law. The determination of two crystallite dimensions is possible. The first is Lc, the stack height, which is the crystallite size in the direction normal to the (00,2) planes, and is determined from the breadths of (00,2), (00,4), (00,6), etc. types of reflections. This indicates the height of a stack of (00,2) planes ordered in the ABAB stacking sequence. La, the coherence length, is more difficult to define, but is related to the diameter or breadth of graphite planes. The planes are actually very large in dimension, but La indicates distances between wrinkles, dislocations, and other such features that scatter X-rays, rather than the breadth of a discrete, disk-like solid. La correlates well with transport properties, like thermal and electrical conductivity, as the conducting phonons and electrons are scatter at these crystal imperfections in similar fashion as do X-rays—though not at exactly the same degree. La, then, can be correlated with the mean-free-paths of phonons, for example, in the prediction of thermal conductivity.

Table 4 summarizes the crystal parameters calculated from the X-ray scans, and FIGS. 11 through 14 illustrate the dependence of some of these parameters on heat treatment temperature. The following tables and FIGS. 9 through 12 summarize these data.

Mass Loss

Mass losses during foaming, calcining, and graphitization were quantified for correlation with the volatile matter content, ash content, and content/forms of sulfur of the different coal precursors. For foaming, the mass of the coal powder was quantified using conventional techniques. For calcining and graphitization, the mass of the foam articles was weighed using the same Ohaus balance before and after heat treatment.

Density

Bulk density was determined by measurement using a vernier caliper, which also allowed quantification of dimensional change, and weighing. Solid, or "true," density was determined by helium pycnometry (Micromeritics AccuPyc 1330).

TABLE 4

Crystal properties of coal foams after graphitization to temperatures between 1600 and 2600° C.

| Raw Material | Heat Treatment | d(002) Angstroms | g | Stack Height (Angstroms) | Coherence Length (Angstroms) | La/Lc Ratio |
|---|---|---|---|---|---|---|
| A | 1600 | 3.4812 | −0.4790 | 41.3 | 31.2 | 0.76 |
| 610 | 1800 | 3.4549 | −0.1727 | 49.6 | 39.5 | 0.80 |
| | 2000 | 3.4368 | 0.0375 | 71.9 | 43.1 | 0.60 |
| | 2200 | 3.4335 | 0.0757 | 73.4 | 44.0 | 0.60 |
| | 2400 | 3.4365 | 0.0403 | 70.8 | 129.5 | 1.83 |
| | 2600 | 3.4338 | 0.0724 | 72.1 | 647.4 | 8.98 |
| B | 1600 | 3.4779 | −0.4411 | 41.0 | 16.8 | 0.41 |
| 729 | 1800 | 3.4612 | −0.2470 | 53.1 | 18.2 | 0.34 |
| | 2000 | 3.4424 | −0.0275 | 81.5 | 38.1 | 0.47 |
| | 2200 | 3.4315 | 0.0984 | 94.9 | 82.0 | 0.86 |
| | 2400 | 3.4389 | 0.0125 | 91.1 | 33.9 | 0.37 |
| | 2600 | 3.4312 | 0.1019 | 95.5 | 100.0 | 1.05 |
| C | 1600 | 3.4629 | −0.2667 | 51.7 | 35.0 | 0.68 |
| POW | 1800 | 3.4485 | −0.0993 | 65.1 | 12.4 | 0.19 |
| | 2000 | 3.4360 | 0.0460 | 117.5 | 33.7 | 0.29 |
| | 2200 | 3.4278 | 0.1416 | 141.2 | 202.6 | 1.44 |
| | 2400 | 3.4101 | 0.3479 | 150.5 | 39.7 | 0.26 |
| | 2600 | 3.4238 | 0.1878 | 155.1 | 46.4 | 0.30 |
| D | 1600 | 3.4550 | −0.1739 | 56.0 | 27.1 | 0.48 |
| 800 | 1800 | | | | | |
| | 2000 | 3.4340 | 0.0693 | 130.9 | 67.1 | 0.51 |
| | 2200 | | | | | |
| | 2400 | 3.4315 | 0.0988 | 187.9 | 315.5 | 1.68 |
| | 2600 | 3.4309 | 0.1063 | 184.7 | 311.5 | 1.69 |
| MIT | 2600 | 3.3804 | 0.6926 | 338.5 | 556.1 | 1.64 |

Mechanical and Physical Testing

The mechanical and physical properties, including (1) bulk density, (2) solid (or true) density, (3) mass and dimensional change during graphitization (relative to calcined mass and dimension), (4) porosity, (5) compressive strength, and (6) compressive modulus, were determined to supplement the electrochemical performance data. Specific methods are described in the following subsections, and data are presented in the Table 5 and FIGS. 13 through 17.

Compressive Strength/Modulus

Compression tests were conducted by test method ASTM C365. It was found that compressive strength data were essentially independent of sample geometry down to sample loading surfaces as small as 0.75-inch square. The platen displacement rate was also studied, and a rate of 0.05 inches per minute was settled on as the standard. Uniform load transfer was accomplished by simply attaching 3M packaging tape to the loaded faces of the foam.

TABLE 5

Mechanical and physical properties of coal foams graphitized over a range of temperatures

| Raw Material | Heat Treatment | Bulk Density (g/cc) | COV on Density | Mass Change (%, rel. to 1050) | Dimension Change (%, rel. to 1050) | Solid Density (g/cc) | Porosity | K | E, compressive (psi) | S, compressive (psi) |
|---|---|---|---|---|---|---|---|---|---|---|
| 610 | 1050 | 0.3758 | 0.0033 | 0.00% | 0.00% | 1.9033 | 0.794 | 3.85 | 56,200 | 1,158 |
| | 1600 | 0.3755 | 0.0002 | 5.98% | 2.25% | 1.9156 | 0.796 | 3.90 | 52,900 | 1,171 |
| | 1800 | 0.3629 | 0.0034 | 9.55% | 2.65% | 1.9188 | 0.801 | 4.03 | 59,300 | 1,134 |
| | 2000 | 0.3682 | 0.0045 | 12.03% | 3.30% | 1.9355 | 0.800 | 4.00 | 53,300 | 986 |

TABLE 5-continued

Mechanical and physical properties of coal foams graphitized over a range of temperatures

| Raw Material | Heat Treatment | Bulk Density (g/cc) | COV on Density | Mass Change (%, rel. to 1050) | Dimension Change (%, rel. to 1050) | Solid Density (g/cc) | Porosity | K | E, compressive (psi) | S, compressive (psi) |
|---|---|---|---|---|---|---|---|---|---|---|
|  | 2200 | 0.3526 | 0.0018 | 17.04% | 4.13% | 1.9065 | 0.807 | 4.18 | 44,100 | 873 |
|  | 2400 | 0.3714 | 0.0076 | 13.95% | 4.20% | 1.9738 | 0.810 | 4.26 | 23,900 | 900 |
|  | 2600 | 0.3629 | 0.0011 | 16.22% | 4.07% | 1.9495 | 0.811 | 4.29 | 40,600 | 877 |
| POW | 1050 | 0.3973 | 0.0004 | 0.00% | 0.00% | 1.9208 | 0.793 | 3.83 | 87,800 | 1,425 |
|  | 1600 | 0.3897 | 0.0066 | 2.86% | 2.39% | 2.0266 | 0.810 | 4.26 | 57,500 | 829 |
|  | 1800 | 0.3891 | 0.0033 | 5.06% | 2.41% | 2.0353 | 0.810 | 4.26 | 54,000 | 958 |
|  | 2000 | 0.3707 | 0.0016 | 8.86% | 2.35% | 2.0691 | 0.820 | 4.56 | 36,700 | 802 |
|  | 2200 | 0.3658 | 0.0029 | 11.48% | 3.11% | 2.0648 | 0.822 | 4.62 | 48,900 | 710 |
|  | 2400 | 0.3787 | 0.0010 | 13.21% | 3.86% | 2.0369 | 0.814 | 4.38 | 32,700 | 839 |
|  | 2600 | 0.3945 | 0.0060 | 10.47% | 3.78% | 2.0647 | 0.807 | 4.18 | 50,200 | 914 |
| 729 | 1050 | 0.5588 | 0.0065 | 0.00% | 0.00% | 1.9059 | 0.709 | 2.44 | 152,000 | 3,097 |
|  | 1600 | 0.5093 | 0.0023 | 9.98% | 2.82% | 1.9891 | 0.745 | 2.92 | 87,300 | 2,729 |
|  | 1800 | 0.5045 | 0.0033 | 13.62% | 3.56% | 2.0062 | 0.747 | 2.95 | 109,000 | 2,571 |
|  | 2000 | 0.4990 | 0.0065 | 16.81% | 4.10% | 1.9923 | 0.752 | 3.03 | 108,000 | 1,865 |
|  | 2200 | 0.4886 | 0.0078 | 19.64% | 4.63% | 1.9731 | 0.755 | 3.08 | 97,100 | 1,646 |
|  | 2400 | 0.5048 | 0.0036 | 19.95% | 4.63% | 1.9878 | 0.747 | 2.95 | 78,900 | 1,688 |
|  | 2600 | 0.4694 | 0.0000 | 20.18% | 4.34% | 1.9436 | 0.758 | 3.13 | 75,800 | 1,480 |
| 800 | 1050 | 0.4905 | 0.0000 | 0.00% | 0.00% | 1.9854 | 0.753 | 3.05 | 132,000 | 2,384 |
|  | 1600 | 0.4836 | 0.0004 | 3.50% | 1.58% | 2.0950 | 0.769 | 3.33 | 85,400 | 1,588 |
|  | 1800 |  |  |  |  |  |  |  |  |  |
|  | 2000 | 0.4568 | 0.0093 | 8.27% | 1.65% | 2.1228 | 0.782 | 3.59 | 75,100 | 1,089 |
|  | 2200 |  |  |  |  |  |  |  |  |  |
|  | 2400 | 0.4624 | 0.0066 | 8.99% | 1.84% | 2.1345 | 0.781 | 3.57 | 54,000 | 1,026 |
|  | 2600 | 0.4581 | 0.0015 | 8.82% | 1.45% | 2.1252 | 0.784 | 3.63 | 47,300 | 986 |

Example 6

Carbon Foam Electrical Properties

Cyclic Voltammetry

Figure 18:
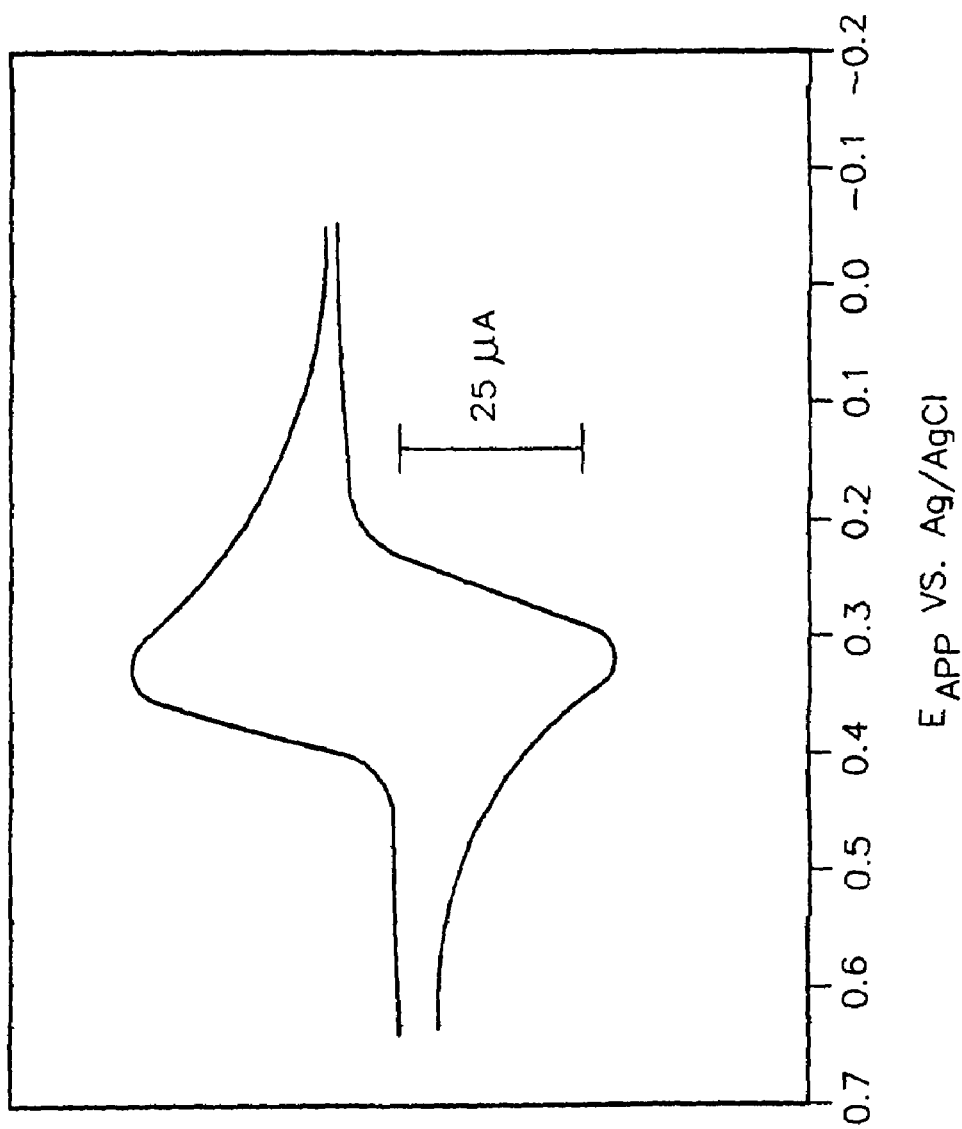
FIG. 18 is a cyclic voltammogram of ferricyanide over a glassy carbon electrode.

The performance of these foams were studied using a cyclic voltammetry (CV) cell and ferricyanide ($Fe^{2+}+Fe^{3+}$ red-ox couple) testing in KCl solution. CV test electrodes were prepared from the carbon foam articles fabricated as just described and CV scans performed to generate electrode-specific voltammograms, post-CV analysis of the used carbon foam electrode was also performed. Electrode performance was examined in a 5 M KCl solution containing ferricyanide (a $Fe^{2+}/Fe^{3+}$ redox couple) and compared to baseline electrode operation in an iron-free KCl solution. With these half-cell reactions, iron is being reduced at the carbon electrode, with the reference electrode being Calumel (Ag/AgCl). In these tests, a scan rate of 5-50 mV/sec was used to generate a closed-loop voltammogram, which was be compared to that of glassy carbon (see FIG. 18) as a benchmark.

Basis of Cyclic Voltammetry

Cyclic voltammetry consists of cycling the potential of a stationary electrode immersed in a quiescent solution and measuring the resulting current. The excitation is a linear potential scan with a triangular waveform. In this study, the scan rate was varied between 5 and 500 mV/sec, depending upon the performance of the individual specimen. The triangular potential excitation signal sweeps the potential of the working electrode back and forth between two designated values called the "switching potentials." A complete voltammogram includes the forward and reverse sweep, and displays the cathodic (reduction) and anodic (oxidation) waveforms. The current at the working electrode is measured under diffusion-controlled, mass transfer conditions.

Figure 19:
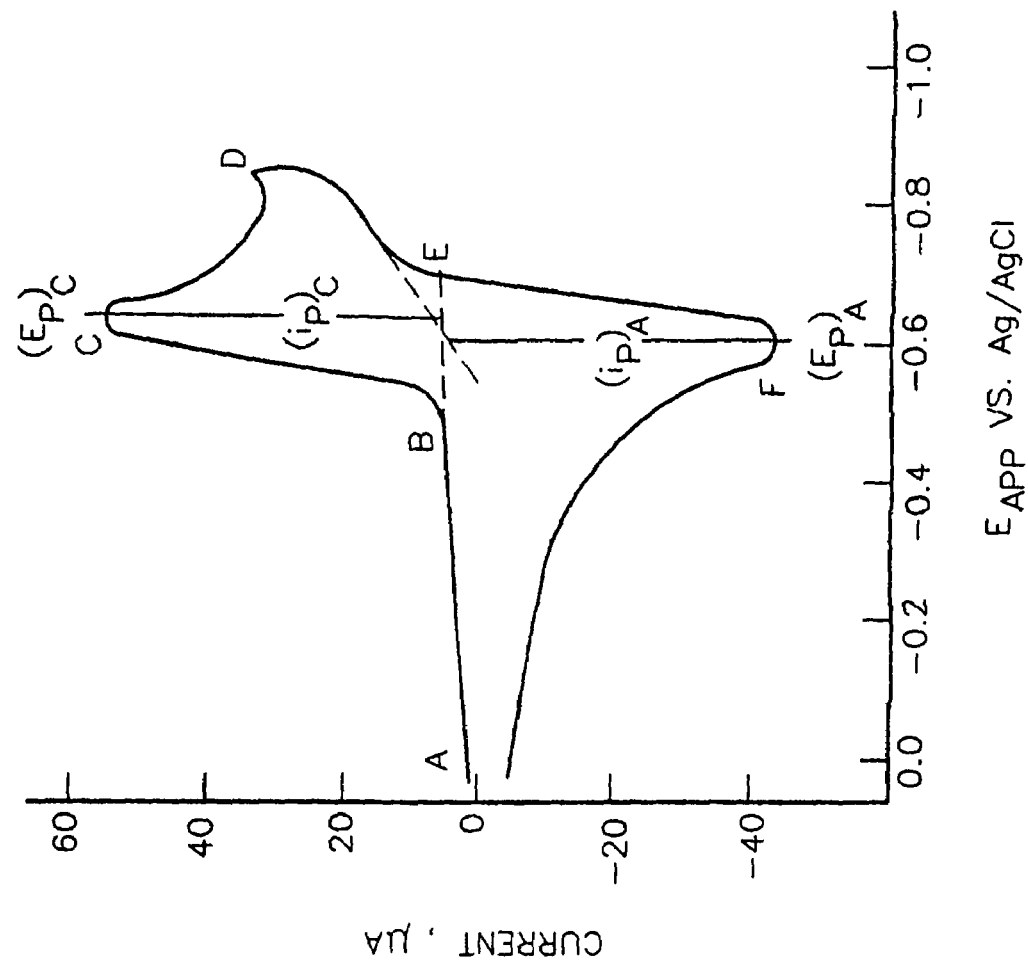
FIG. 19 is a schematic cyclic voltammogram in the Ag/AgCl system.

A schematic voltammogram is presented in FIG. 19. The scan begins at a potential of 0.0V (point a) and initial scan is in the negative direction. When the potential becomes sufficiently negative (in this example, around −0.6V), reduction of electroactive species at the electrode surface is initiated and cathodic current begins to flow (point b). The cathodic current increases rapidly until the surface concentration of oxidant approaches zero and the current, now diffusion-limited, peaks at point c. As the potential becomes more negative, the current decays in proportion to $t^{-1/2}$, according to the Cottrell equation, as the solution surrounding the electrode is depleted of oxidant (which is converted to the reduced state). A fine rise in current (at point d) results from discharge of the electrolyte solution. At the switching potential (here −0.9V), the scan is reversed to the positive direction. However, the potential remains sufficiently negative to continue reduction of the oxidant, and the cathodic current continued for part of the reverse (positive) scan. Eventually, the potential becomes sufficiently positive to oxidize the reductant that had been accumulating near the electrode surface. Anodic current begins to flow and counterbalance the cathodic current. Then, in similar fashion as described for the cathodic process, anodic current increases rapidly until the concentration of reductant at the electrode surface approaches zero (point f), and peaks. The anodic current then decays as the solution surrounding the electrode is depleted of reductant. When returned to the starting potential, the reduced material is still present at the electrode and oxidizes back to the initial form of the couple.

The important parameters that are recorded from a voltammogram include:

anodic peak current, $(i_p)_a$,
cathodic peak current, $(i_p)_c$,
anodic peak potential, $(E_p)_a$,
cathodic peak potential, $(E_p)_c$, and
half-peak potential, $(E_{p/2})_c$.

The peak current for the oxidant, assuming initial cathodic scan, is given by $$i_p = n^{\frac{3}{2}} F^{\frac{3}{2}} \left(\frac{\pi \vartheta D_{ox}}{RT}\right)^{\frac{1}{2}} AC_{ox}\chi(\sigma t),$$

where
$i_p$ is in amperes,
n is the number of electrons transferred in the electrode reaction,
R is in $JK^{-1} mol_{-1}$,
T is in Kelvin,
A is area, in $cm^2$,
D is the diffusion coefficient, in $cm^2/sec$,
C is the concentration, in $mol/cm^3$,
υ is the scan rate, in V/sec, and
χ(σt) is a tabulated function, whose value is 0.446 for a simple, diffusion-controlled electron transfer reaction.

For a reversible wave, $E_p$ is independent of scan rate, and $i_p$ is proportional to $v^{1/2}$. The number of electrons transferred, n, can be determine from the separation in cathodic and anodic potential peaks, by $$(E_p)_a - (E_p)_c = \frac{0.057}{n}.$$

The formal potential for the reversible couple is centered between the cathodic and anodic peak potentials. Irreversibility of a wave is indicated by the lack of a reverse peak. Reversibility can also be evaluated by plotting $(i_p)_c$ or $(i_p)_c$ versus the square root of the scan velocity. Such plots should be linear with intercepts at the origin.

Voltammogram Analysis

Analysis of the carbon foam voltammograms allowed checking for Nernstian behavior, adequate current density, and stability of the voltammogram shape (i.e., scan rate pattern) over an extended test period. The latter demonstrated whether the carbon foam adsorbs ions from solution, resulting in contamination that would inhibit current flow. A positive result from these tests would is a high current density (relative to that of a glassy carbon electrode) and a scan rate pattern that could be maintained over several CV cycles with minimal current degradation. A post-CV analysis of the carbon foam electrode with energy dispersive X-ray spectrometer analysis (EDS) tested for electrode contamination by oxygen, iron, or other impurities that might degrade performance. Such analysis indicated minimal such contamination.

A key to the CV screening tests was to prepare the working coal-based, carbon foam electrodes (and the glassy carbon reference) to be both compatible with the voltammeter apparatus and representative of the type of service it would experience in an actual fuel cell. The recommended procedure is to machine the carbon foam as a monolithic insert to the working electrode of the CV apparatus and epoxy it in place. A mercury droplet was used to assure good conductivity between the carbon foam material and the copper conductor in the electrode connector. The foam's pores could then be filled with Nugel™ (or mineral oil) to eliminate mass transfer effects in the pore structure during the CV screening tests. To further analyze for mass transfer processes in the foams, and their relationship to foam cell structure, the mineral oil was removed and CV tests repeated. A summary of cyclic voltammetry results for the different precursor/heat treatment combinations considered as part of the evaluation study is presented in Table 6.

TABLE 7

Summary of electrode performance in ferricyanide system

| | | Solution | | | $KCl\ w/K_3Fe(CN)_6$ | | | | | |
|---|---|---|---|---|---|---|---|---|---|---|
| | | Scan Rate | 5 | | | 25 | | | 50 | |
| Schedule | Sample | $I_p$ (A) | $E_{pa}$ (mV) | $E_{pc}$ (mV) | $I_p$ (A) | $E_{pa}$ (mV) | $E_{pc}$ (mV) | $I_p$ (A) | $E_{pa}$ (mV) | $E_{pc}$ (mV) |
| 0 | Glassy C | 1.872E−05 | | 233.5 | 3.819E−05 | | 222.6 | 6.557E−05 | | 218.1 |
| 1 | A1-1600 | 1.349E−04 | 311.8 | 247.1 | 3.851E−04 | 342.2 | 228.1 | 5.159E−04 | 355.2 | 212.9 |
| 1 | A2-1800 | 5.206E−05 | 332.9 | 193.9 | 1.044E−04 | N/A | 152.1 | 1.298E−04 | N/A | 114.1 |
| 1 | A3-2000 | 9.228E−05 | 337.1 | 220.5 | 2.087E−04 | 405.2 | 178.7 | 2.743E−04 | N/A | 152.1 |
| 1 | A4-2200 | 1.143E−04 | 291.4 | 197.7 | 2.201E−04 | 326.2 | 133.1 | 2.399E−04 | 341.3 | 95.1 |
| 2 | A5-2400 | 1.066E−04 | 270.1 | 178.7 | 2.402E−04 | 310.4 | 129.3 | 3.143E−04 | 343.1 | 102.7 |
| 2 | A6-2600 | 7.683E−05 | 247.5 | 144.5 | 1.774E−04 | 302.1 | 83.7 | 2.377E−04 | 344.3 | 41.8 |
| 2 | A7-1050 | 5.175E−05 | 288.4 | 201.5 | 1.025E−04 | 317.9 | 155.9 | 1.188E−04 | 321.6 | 129.3 |
| 2 | B1-1600 | 8.889E−05 | 304.2 | 197.7 | 2.106E−04 | 342.2 | 171.1 | 2.852E−04 | 357.4 | 155.9 |
| 3 | B2-1800 | 8.889E−05 | 302.9 | 220.5 | 2.540E−04 | 349.4 | 174.9 | 3.513E−04 | 385.6 | 148.3 |
| 3 | B3-2000 | 1.175E−04 | 287.3 | 197.7 | 3.270E−04 | 356.8 | 136.9 | 4.444E−04 | 393.3 | 95.1 |
| 3 | B4-2200 | 1.586E−01 | 284.8 | 205.3 | 4.190E−04 | 333.0 | 159.7 | 5.503E−04 | 352.8 | 133.1 |
| 3 | B5-2400 | 8.222E−05 | 269.3 | 186.3 | 1.902E−04 | 311.9 | 114.1 | 2.584E−04 | 343.7 | 76.0 |
| 4 | B6-2600 | 1.109E−04 | 325.1 | 220.5 | 2.040E−04 | 375.3 | 193.9 | 2.188E−04 | 382.1 | 190.1 |
| 4 | B7-1050 | 5.071E−05 | 303.9 | 205.8 | 1.136E−04 | 342.2 | 154.6 | 1.502E−04 | 375.6 | 111.7 |
| 4 | C1-1600 | 6.085E−05 | 312.8 | 199.0 | 1.048E−04 | 338.5 | 128.1 | 1.062E−04 | 383.2 | 75.2 |
| 4 | C2-1800 | 1.298E−05 | 301.8 | 223.3 | 2.250E−05 | 321.3 | 222.0 | 2.881E−05 | 324.2 | 215.4 |
| 5 | C3-2000 | 6.667E−05 | 272.8 | 159.4 | 1.567E−04 | 294.1 | 111.5 | 2.114E−01 | 311.4 | 97.5 |
| 5 | C4-2200 | 9.947E−05 | 300.0 | 197.3 | 1.862E−04 | 324.0 | 168.0 | 2.285E−04 | 331.9 | 161.8 |
| 5 | C5-2400 | 9.841E−05 | 300.7 | 182.9 | 2.056E−04 | 344.6 | 11.0 | 2.690E−04 | 416.4 | 65.1 |
| 5 | C6-2600 | 5.757E−05 | 308.6 | 201.1 | 9.566E−05 | 346.6 | 179.3 | 1.082E−04 | 360.8 | 153.6 |
| 6 | C7-1050 | 1.031E−04 | 333.4 | 216.8 | 1.964E−04 | 444.9 | 133.1 | 1.206E−04 | 361.2 | 182.5 |
| 6 | D1-1600 | 4.804E−05 | 295.4 | 237.7 | 1.159E−04 | 319.4 | 211.8 | 1.604E−04 | 339.4 | 191.8 |
| 6 | D2-2000 | 9.503E−05 | 268.3 | 180.6 | 2.382E−04 | 316.2 | 103.8 | 2.502E−04 | 340.1 | 47.3 |
| 6 | D3-2400 | 7.143E−05 | 297.8 | 222.2 | 1.468E−04 | 339.2 | 203.7 | 1.786E−04 | 389.1 | 196.6 |
| 7 | D4-2600 | 6.349E−05 | 308.7 | 242.8 | 1.548E−04 | 339.0 | 225.0 | 2.143E−04 | 363.0 | 209.3 |

TABLE 7-continued

Summary of electrode performance in ferricyanide system

| | | | | | | | | | | |
|---|---|---|---|---|---|---|---|---|---|---|
| 7 | MB-2700 | 5.778E−05 | 340.7 | 175.4 | 1.045E−04 | 382.5 | 54.4 | N/A | N/A | N/A |
| 7 | G80 | 1.871E−05 | 308.0 | 231.9 | 3.594E−04 | 389.5 | 174.0 | 5.074E−04 | 429.7 | 138.9 |
| 7 | G100 | N/A | N/A | N | 2.646E−04 | 399.2 | 159.7 | 3.439E−04 | 448.7 | 125.5 |

| | | Solution | | | $KCl\ w/K_3\ Fe(CN)_6$ | | | | |
|---|---|---|---|---|---|---|---|---|---|
| | | Scan Rate | 100 | | | 500 | | | |
| Schedule | Sample | $I_p$ (A) | $E_{pa}$ (mV) | $E_{pc}$ (mV) | $I_p$ (A) | $E_{pa}$ (mV) | $E_{pc}$ (mV) | | |
| 0 | Glassy C | 6.811E−05 | | 209.3 | 1.344E−04 | | 175.8 | | |
| 1 | A1-1600 | 6.984E−04 | 374.1 | 201.5 | 1.476E−03 | N/A | 152.1 | | |
| 1 | A2-1800 | 3.108E−04 | N/A | −448.7 | N/A | N/A | N/A | | |
| 1 | A3-2000 | 3.526E−04 | N/A | 106.5 | N/A | N/A | N/A | | |
| 1 | A4-2200 | 2.783E−04 | 360.6 | 76.0 | 4.825E−04 | N/A | 38.0 | | |
| 2 | A5-2400 | 4.127E−04 | 387.3 | 76.0 | 9.312E−04 | N/A | −102.7 | | |
| 2 | A6-2600 | 3.042E−04 | N/A | −7.6 | N/A | N/A | N/A | | |
| 2 | A7-1050 | 1.444E−04 | 332.8 | 106.5 | 2.635E−04 | 393.3 | 53.2 | | |
| 2 | B1-1600 | 3.704E−04 | 384.0 | 133.1 | 6.074E−04 | 494.3 | 22.8 | | |
| 3 | B2-1800 | 4.413E−04 | 435.0 | 114.1 | N/A | N/A | N/A | | |
| 3 | B3-2000 | 5.556E−04 | 428.4 | 68.4 | N/A | N/A | N/A | | |
| 3 | B4-2200 | 7.238E−04 | 367.6 | 102.7 | N/A | N/A | N/A | | |
| 3 | B5-2400 | 3.394E−04 | 384.2 | 30.4 | N/A | N/A | N/A | | |
| 4 | B6-2600 | 2.434E−04 | 402.7 | 182.5 | 4.683E−04 | 497.3 | 114.1 | | |
| 4 | B7-1050 | 1.936E−04 | 428.7 | 51.8 | 2.730E−04 | 608.4 | −121.7 | | |
| 4 | C1-1600 | 1.240E−04 | 426.8 | 62.0 | 2.525E−04 | 556.7 | −35.7 | | |
| 4 | C2-1800 | 3.631E−05 | 335.1 | 205.4 | 7.143E−05 | 356.7 | 183.0 | | |
| 5 | C3-2000 | 2.895E−04 | 335.4 | 75.7 | 6.000E−04 | 484.4 | −26.0 | | |
| 5 | C4-2200 | 2.442E−04 | 343.3 | 161.8 | 6.349E−04 | 398.1 | 118.9 | | |
| 5 | C5-2400 | 3.563E−04 | 514.3 | 13.2 | 7.452E−04 | N/A | −232.3 | | |
| 5 | C6-2600 | N/A | N/A | N/A | N/A | N/A | N/A | | |
| 6 | C7-1050 | 1.429E−04 | 391.8 | 167.3 | 1.772E−04 | 452.5 | 79.8 | | |
| 6 | D1-1600 | 2.142E−04 | 367.3 | 166.3 | N/A | N/A | N/A | | |
| 6 | D2-2000 | 3.244E−04 | 399.4 | −15.6 | N/A | N/A | N/A | | |
| 6 | D3-2400 | 2.143E−04 | 401.9 | 180.9 | N/A | N/A | N/A | | |
| 7 | D4-2600 | 2.857E−04 | 396.5 | 188.4 | N/A | N/A | N/A | | |
| 7 | MB-2700 | N/A | N/A | N/A | N/A | N/A | N/A | | |
| 7 | G80 | 5.291E−04 | 494.3 | 95.1 | N/A | N/A | N/A | | |
| 7 | G100 | 4.497E−04 | 551.3 | 63.7 | N/A | N/A | N/A | | |

Note:
A = Foam produced from an extract of 610 (high-volatile bituminous) coal
B = Foam produced from an extract of 729 (high-volatile bituminous) coal
C = Foam produced from an extract of Powellton (high-volatile bituminous) coal
D = Foam produced from an extract of 800 (high-volatile bituminous) coal
MB = "standard" foam produced from Mitsubishi ARA24 synthetic resin (mesophase pitch derived from napthalane)
Number after "—" are graphite temperature (° C.)

Cyclic Voltammetry Scans

Figure 20:
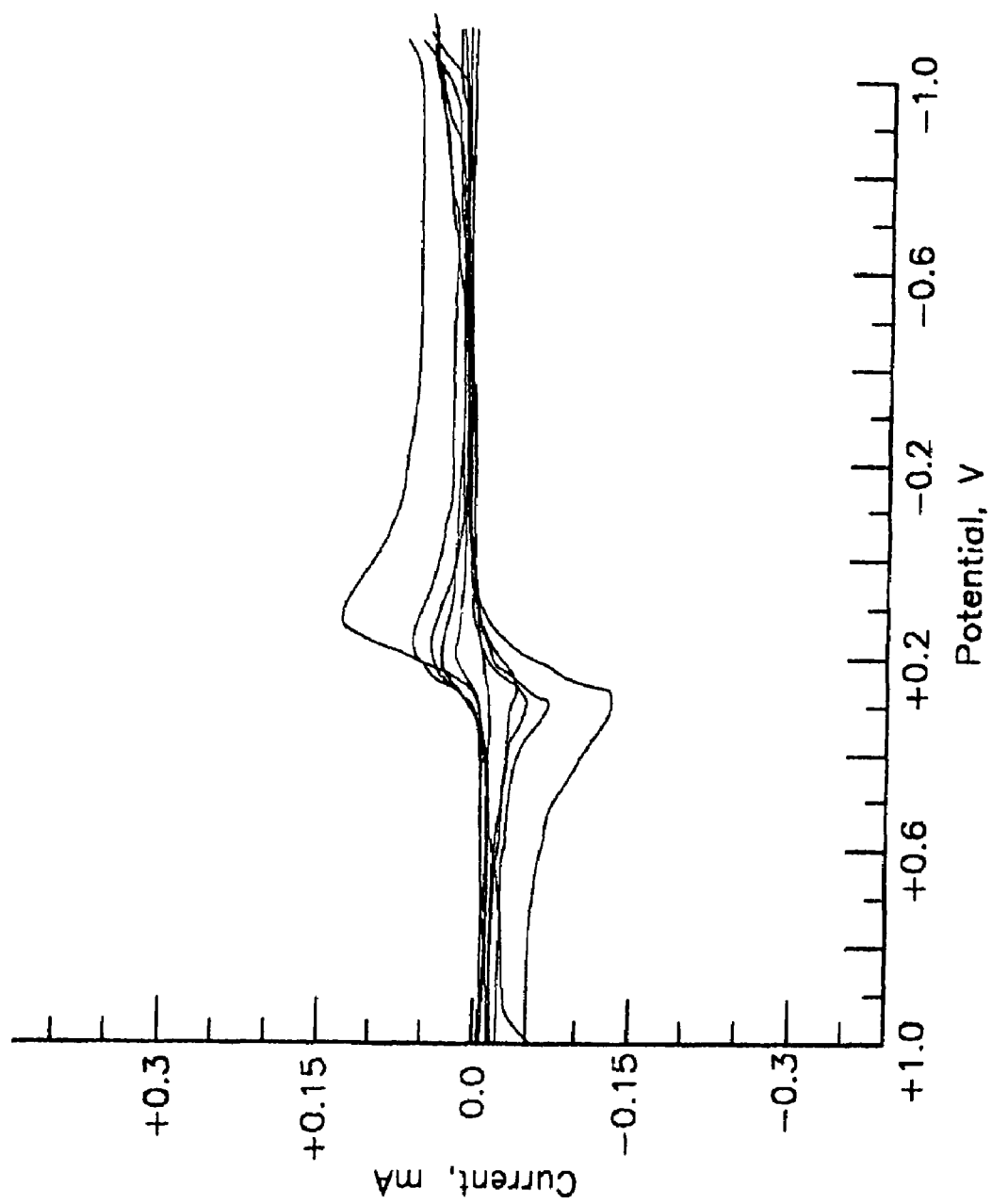
FIGS. 20 through 27 are cyclic voltammograms for a variety of electrode materials evaluated as described hereinafter.
Figure 21:
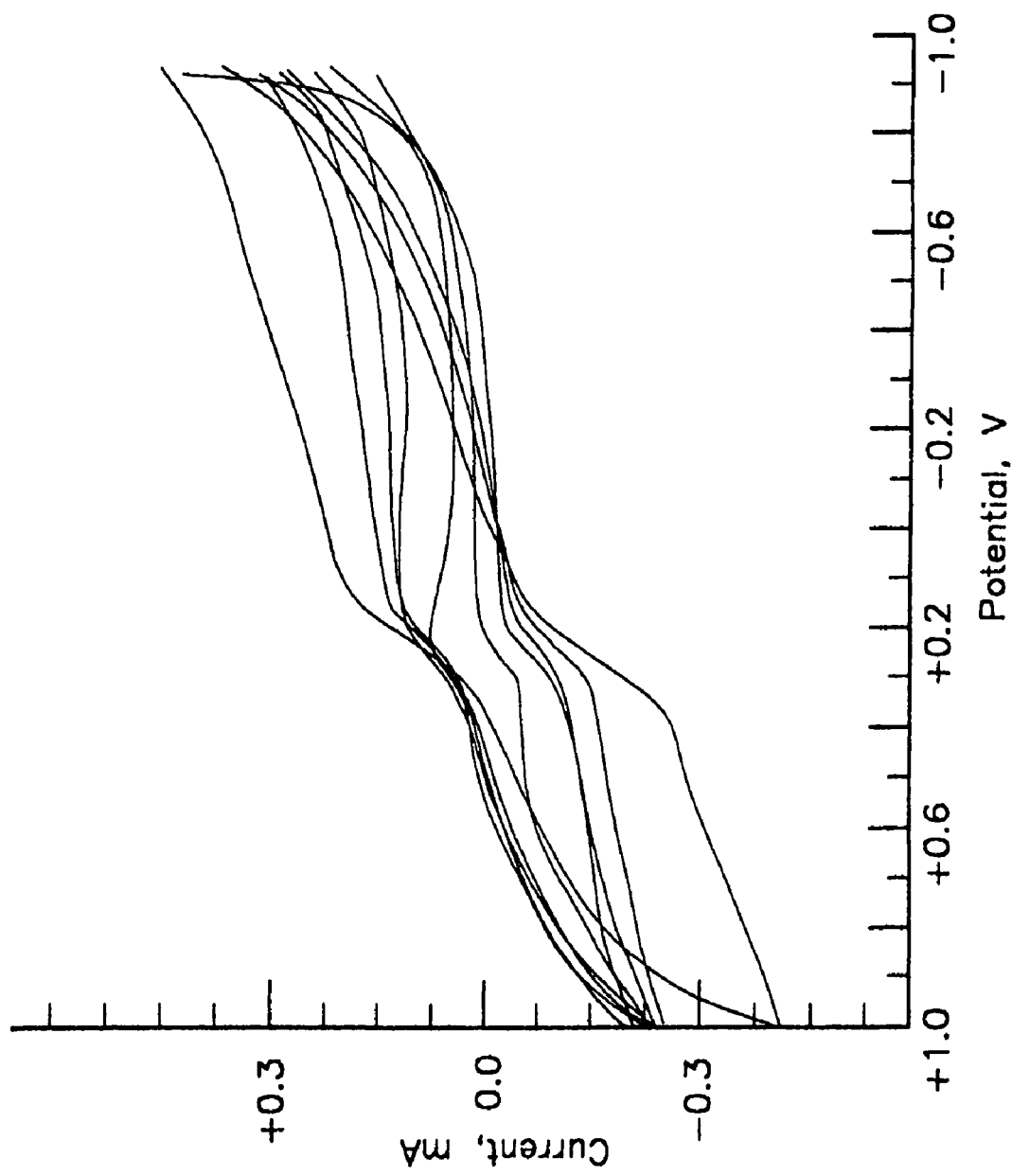
Figure 22:
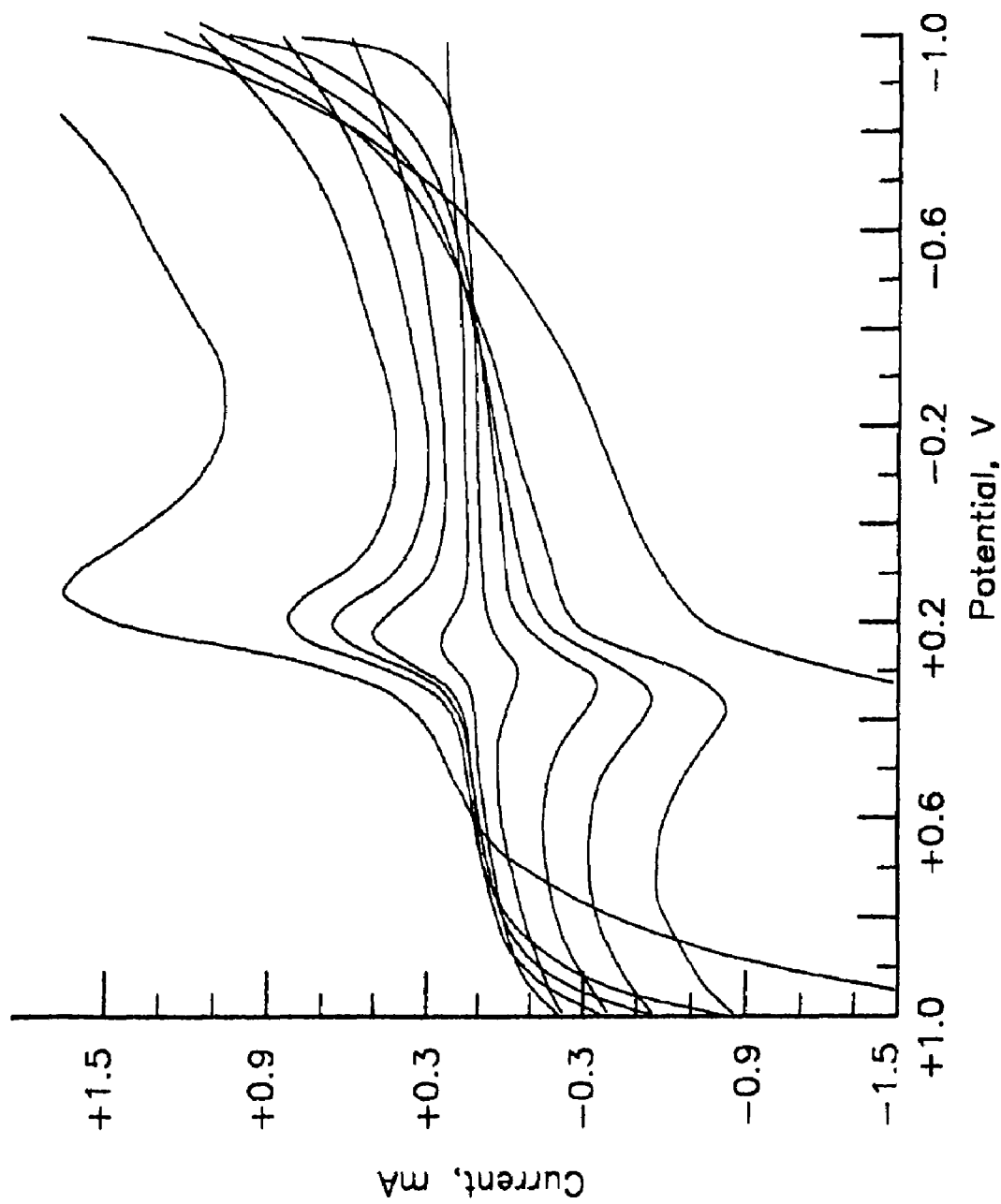
Figure 23:
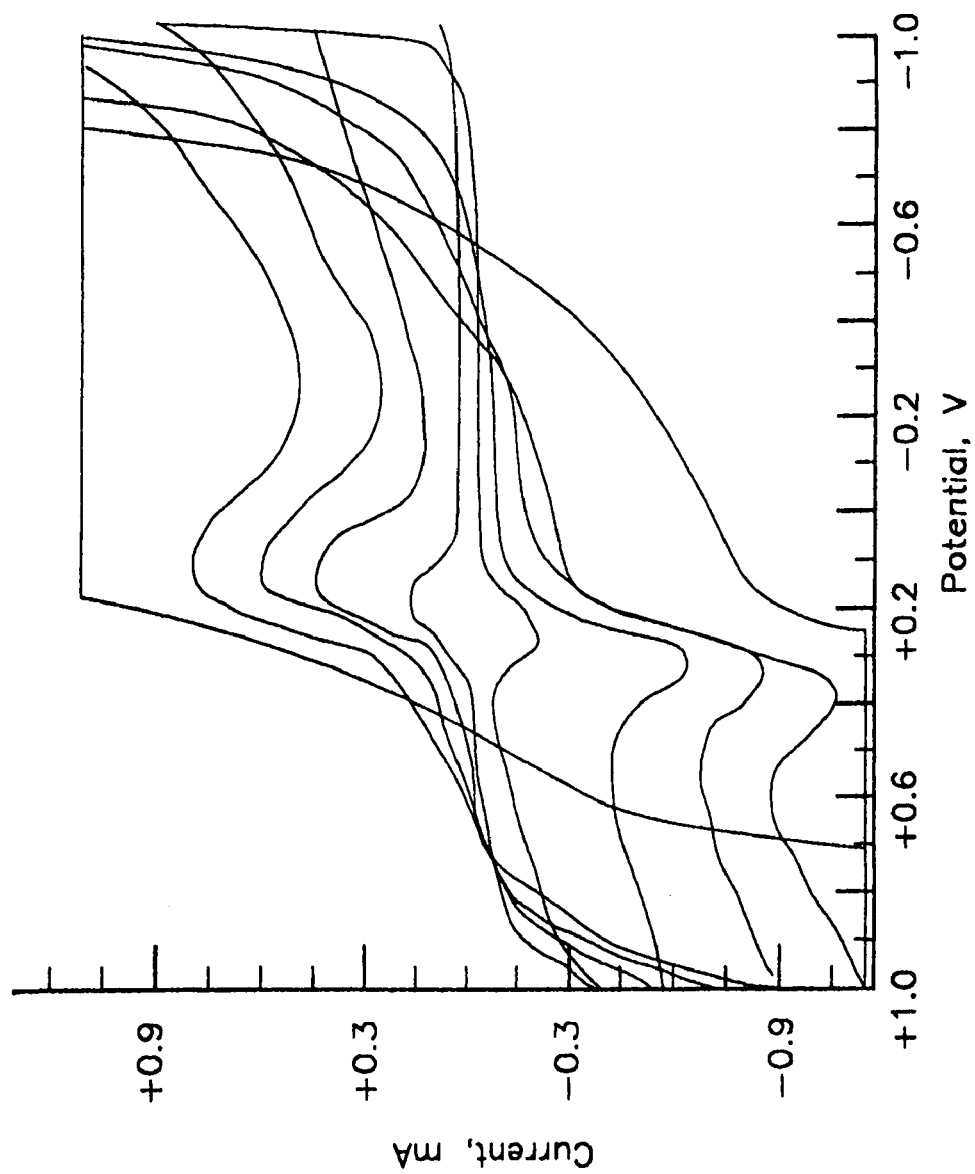
Figure 24:
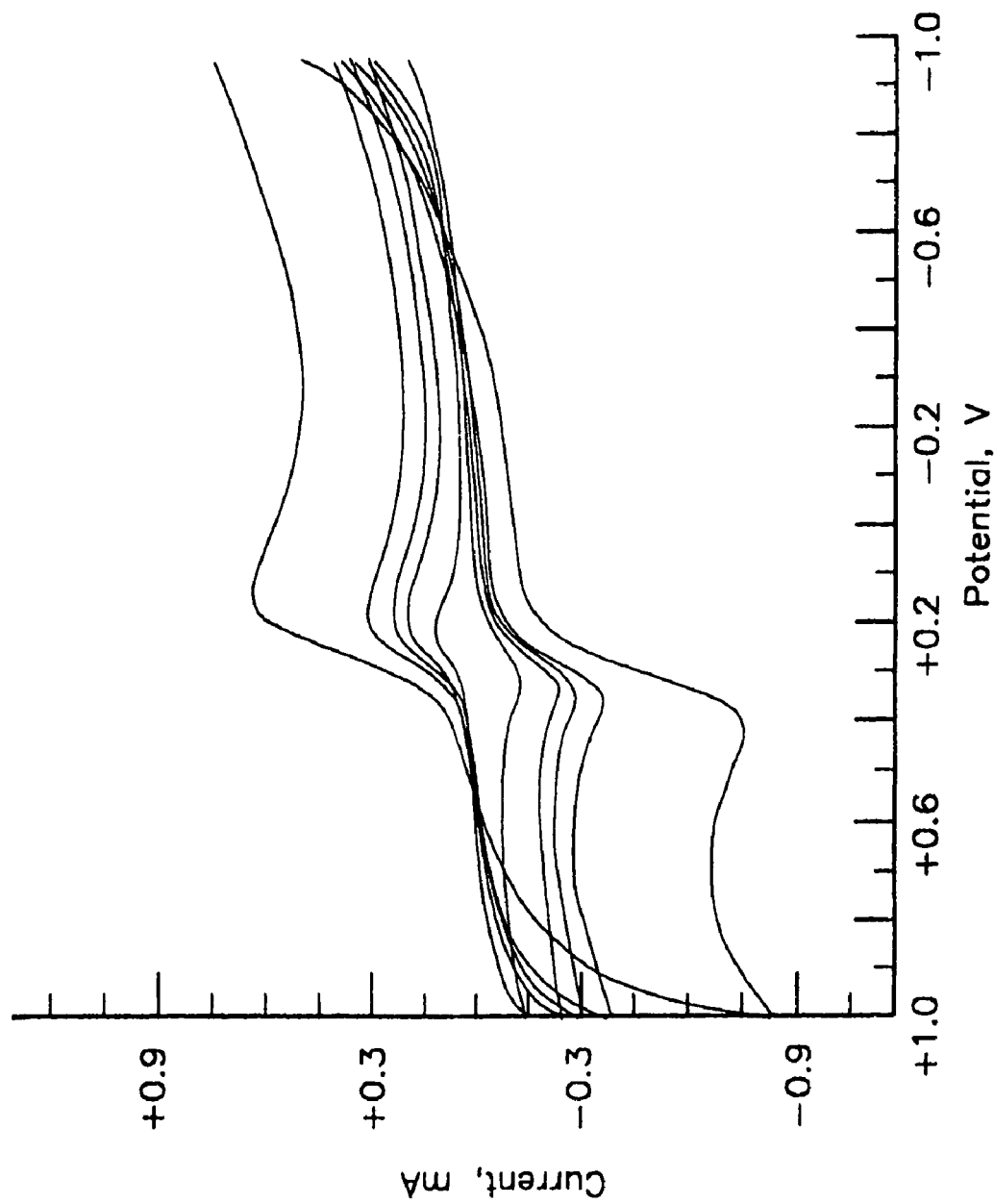
Figure 25:
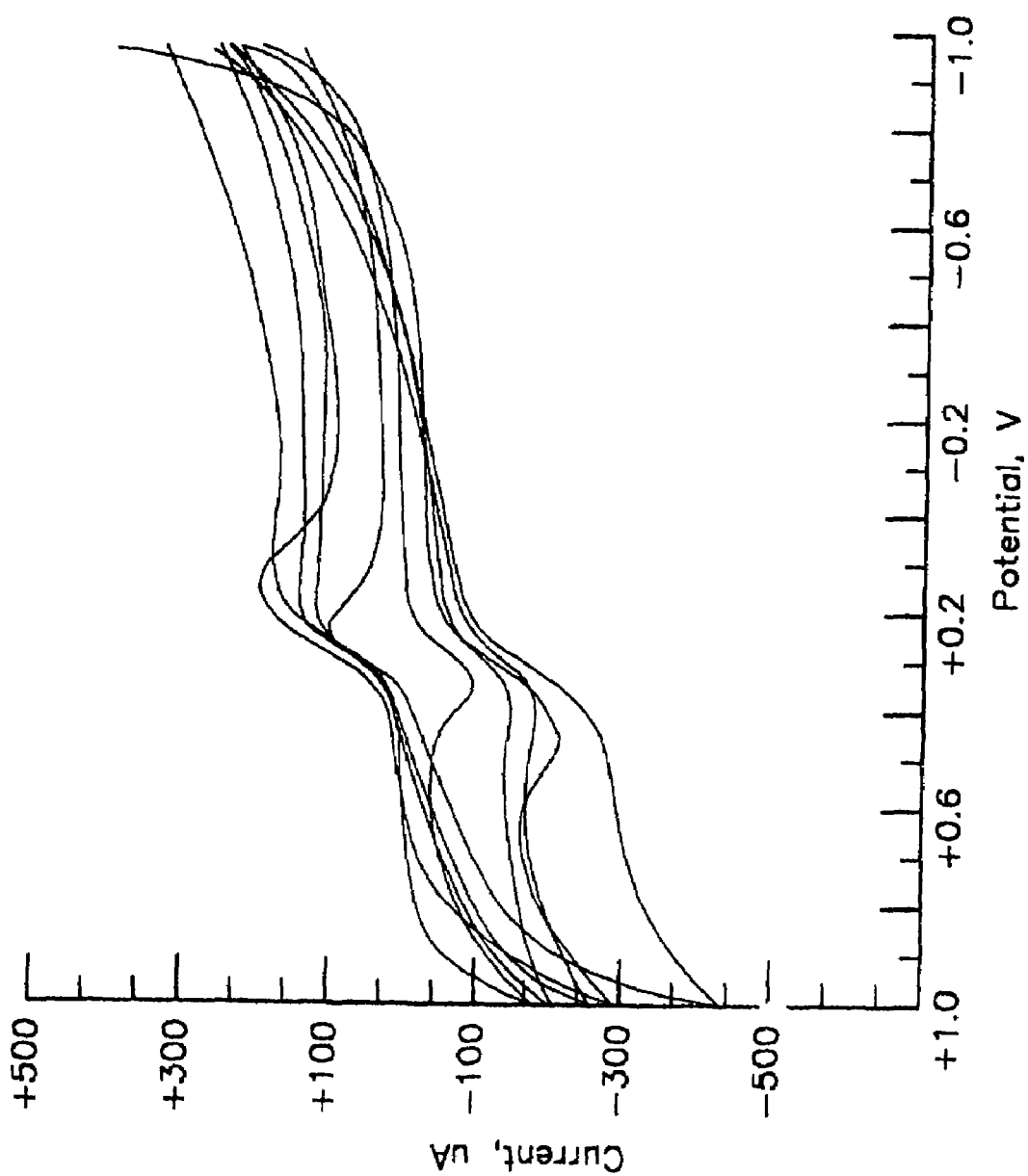
Figure 26:
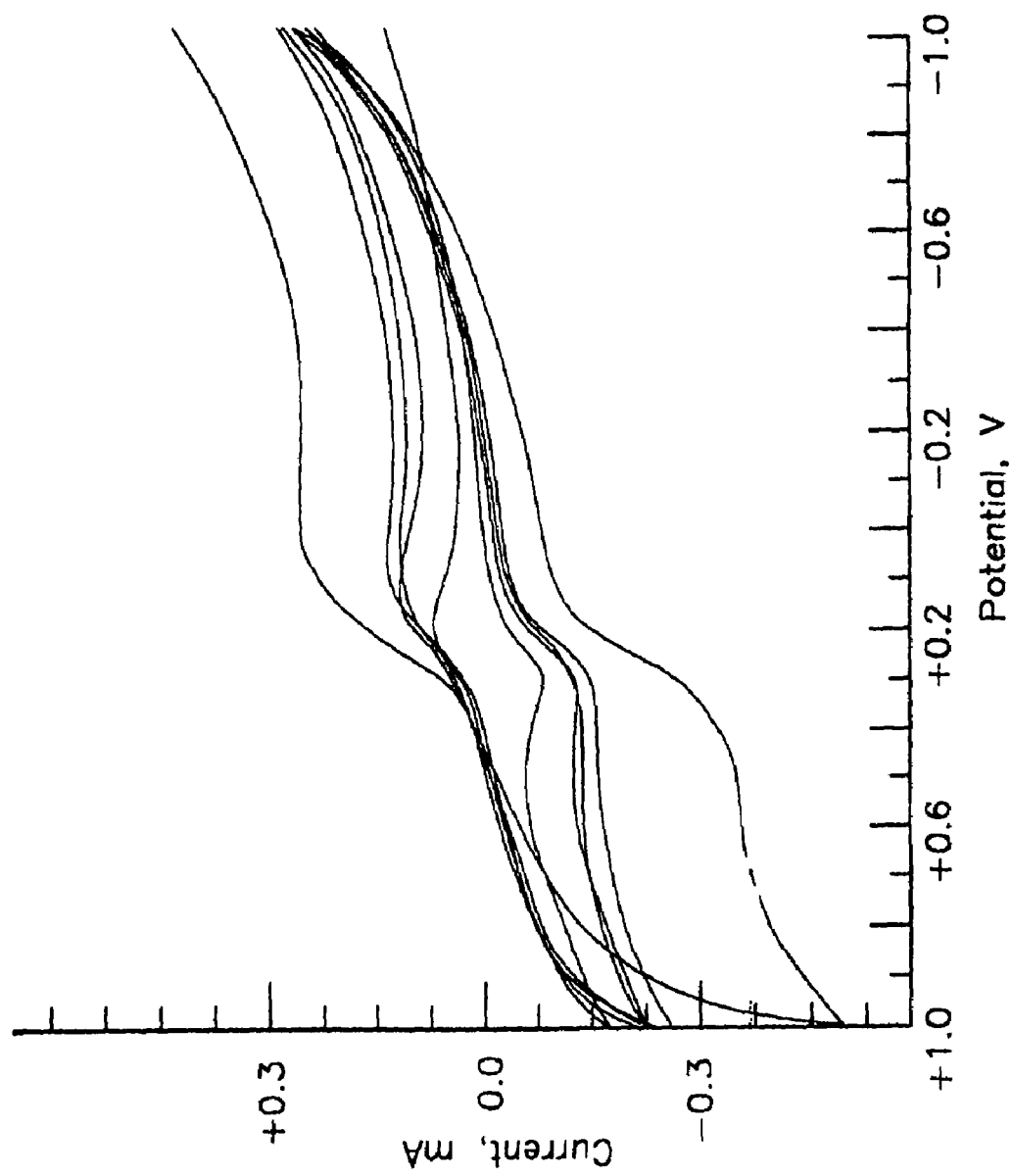
Figure 27:
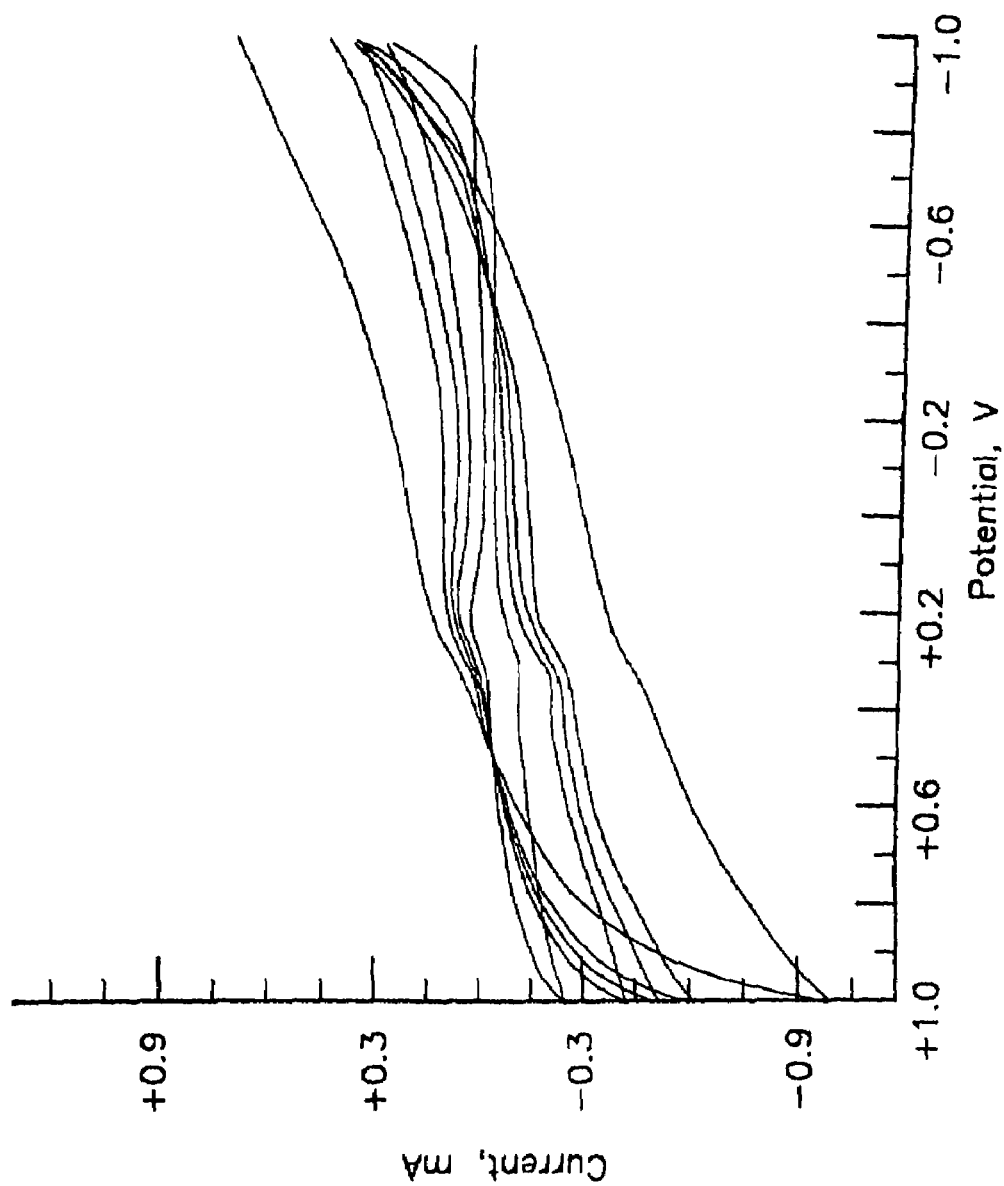

Voltammograms for example materials are presented in the following figures, including:

FIG. 20: glassy carbon (control standard),

FIG. 21: Mitsubishi ARA24 synthetically-prepared mesophase pitch foam (labeled M or MB), FIG. 22: A1 (610 coal-based foam, heat treated to 1600° C.), FIG. 23: B4 (729 coal-based foam, heat treated to 2200° C.), FIG. 24: C4 (Powellton coal-based foam, heat treated to 2200° C.), FIG. 25: C7 (Powellton coal-based foam, heat treated to 1050° C.), FIG. 26: C1 (Powellton coal-based foam, heat treated to 1600° C.), and FIG. 27: C6 (Powellton coal-based foam, heat-treated to 2600° C.).

Examined together, voltammograms from samples C4, then C7, C1 and C6 (increasing in heat treatment temperature), illustrate the effects of combined graphitic ordering and impurity removal on performance.

From these evaluations, it can be seen that very well developed, Nernstian waveforms are developed in the case of B4 and C4 samples. These materials also offer very good current density, higher than that of the glassy carbon electrode material. When only the C-series (Powellton coal) samples are considered at low scan rate (5 mV/sec), it can be seen that the current density reaches a peak for the 2200° C. heat-treated sample (see Table 8). Lower heat treatment temperatures may produce too little graphitic ordering. At higher temperatures, the crystal ordering—for this high-sulfur coal—is destroyed by the liberation of thiophenic sulfur as $CS_2$. Unless extracted prior to foaming to remove essentially all of the aromatic sulfur, all such coal- or petroleum-based materials will exhibit similar behavior. That is, a temperature will exist that will provide optimum current density. Such an effect would not be expected of the clean, synthetically prepared pitches, like Mitsubishi ARA24.

Example

C-Series Samples

TABLE 7

C-series foam performance at low potential scan rate

| Sample | Heat Treatment (° C.) | $I_p$ (A) @ 5 mv/sec | $E_{pa}$ (Mv) @ 5 mV/sec | $E_{pc}$ (mV) @ mV/sec |
|---|---|---|---|---|
| C7 | 1050 | $1.031 \times 10^{-4}$ | 333.4 | 216.8 |
| C1 | 1600 | $6.085 \times 10^{-5}$ | 312.8 | 199.0 |
| C2 | 1800 | $1.298 \times 10^{-5}$ | 301.8 | 223.3 |
| C3 | 2000 | $6.667 \times 10^{-5}$ | 272.8 | 159.4 |
| C4 | 2200 | $9.947 \times 10^{-5}$ | 300.0 | 197.3 |
| C5 | 2400 | $9.841 \times 10^{-5}$ | 300.7 | 182.9 |
| C6 | 2600 | $5.757 \times 10^{-5}$ | 308.6 | 201.1 |

Performance at Varying Electrolyte Concentrations

The high performance foams (e.g., MB, B4, and C4, as well as the glassy carbon control) also were examined by recording the same voltammogram at a range of KCl concentrations. In all cases, the voltammograms were very stable with concentration, with the cathodic and anodic peaks separating slightly with increasing concentration. MB and samples B4 and C4 all demonstrated higher current density than the glassy carbon electrode, with sample B4 most closely approximating the performance of the synthetic pitch-based foam.

Reversibility of the Couple

The reversibilities of the waveforms for (1) glassy carbon, (2) synthetic pitch-based foam, (3) sample B4, and (4) sample C4, and their stability versus KCl concentration, were examined over a narrow potential scan rate range. With the exception of sample C4, the waveforms were all reversible in that the plot of peak current ($I_p$) versus square root of applied potential ($V^{1/2}$) is linear.

Activation of the foams described herein with nickel or intercalation with dichromate and other similar suitable electrode activators is clearly possible and foams that have been so activated are clearly contemplated as being included within the scope of the appended claims.

Thus, the feasibility of employing low-cost bituminous coal-based carbon foams as electrodes for fuel cells has been demonstrated. Foams representing a wide range of precursor compositions, foam cell sizes, and heat treatment temperatures have all produced satisfactory electrodes for such applications. The following have thus been demonstrated for the use of these coal-base carbon foams as fuel cell electrodes:

Nernstian behavior for the ferrosene redox couplet in KCl solution, improved electrode current density for carbon foams as compared to conventional glassy carbons, higher "active" surface area, by 1-2 orders of magnitude, than glassy carbons, significant mass transfer effects (indicated by CV hysteresis, and intentionally not masked by the inclusion of fillers), stability of voltammogram shape at different scan rates and KCl concentration and over extended cycling periods, that the carbon foam electrode does not suffer contamination and concomitant degraded current flow, inertness of carbon foams to a number of chemicals, including KCl, phosphoric acid, methanol, propylene carbonate, etc., and the low "active" surface area of current carbon foams (typically within the narrow range of 0.1 to 2.0 m²/g).

Of the candidate precursor materials and heat treatment conditions described hereinabove, the foam based on synthetically-prepared pitch ("M") offered the highest current density and quality of voltammogram shape. Samples B4 and C4 were, however, next in performance. These precursors (729 and Powellton coals) are less than 1/100th the cost of the synthetic pitch, making these materials more attractive given their significant cost advantages and relatively similar performance.

While the coal-based, carbon foams described herein have been so described primarily in the context of their use in fuel cells that include a polymer electrolyte membrane, it will be apparent to the skilled artisan that they are similarly useful in fuel cells such as phosphoric acid fuel cells as well as electrodes for batteries.

In this latter context, certain batteries may be described as concentration cells powered by the transfer of ions between two electrodes: a cathode and an anode of, for example, intercalated graphite. The use of carbonaceous materials (derived from carbon precursors) as anode electrodes has several advantages including reliability, safety, and increased cycle life. Present anode materials include carbonaceous materials, such as natural graphite, cokes, Meso Carbon Micro Beads (MCMB), and non-graphitizable carbon forms (e.g., glassy carbons) but not coal-based carbon foams of the types described herein. However, many critical parameters, such as surface area and porosity, are difficult to predict and control for these prior art materials. Surface area and porosity are crucial for battery applications since the formation of decomposition products on the surface of the carbon (mainly due to reactions with the electrolyte) may lead to a passivating layer.

It is clearly contemplated that the coal-based carbon foams described hereinabove are useful as one or both of the electrodes of battery devices and in fuel cell applications that do not necessarily involve the use of a polymer electrolyte membrane.

As the invention has been described, it will be apparent to those skilled in the art that the same may be varied in many ways without departing from the spirit and scope of the invention. Any and all such modifications are intended to be included within the scope of the appended claims.

What is claimed is:

1. A fuel cell comprising:
    a polymer electrolyte membrane;
    an anode;
    a cathode; and
    conductors for the supply of electrical current to an electrical load,
    wherein at least one of said anode and said cathode comprises a coal-based carbon foam having 7.45% (D/B) to 9.65% (D/B) ash, a density in the range of about 0.1 g/cm³ to about 0.8 g/cm³ and a pore size below about 2000 μm.

2. The fuel cell of claim 1, wherein said coal-based carbon foam is produced from particulate coal having a diameter less than about 1 mm.

3. The fuel cell of claim 1, wherein said coal-based carbon foam has a compressive strength below about 6000 psi.

4. The fuel cell of claim 1, wherein said coal-based carbon foam is prepared from bituminous coal.

5. The fuel cell of claim 1, wherein said coal-based carbon foam exhibits a pore size below about 100μ.

6. The fuel cell of claim 1, wherein said coal-based carbon foam has been graphitized at a temperature ranging from about 1600° C. to about 3000° C.

7. The fuel cell of claim 1, wherein said coal-based carbon foam has been graphitized at a temperature between about 1800° C. and about 2200° C.

8. The fuel cell of claim 1, wherein said coal-based carbon foam is prepared by a process comprising the steps of:
   comminuting coal to a small particle size to form a ground coal;
   placing said ground coal in a mold;
   heating said ground coal in said mold under a non-oxidizing atmosphere to a temperature of ranging from about 300° C. to about 700° C. to form an electrode preform; and
   graphitizing said electrode preform at a temperature ranging from about 1600° C. to about 3000° C.

9. An electrical cell for the generation or storage of electrical power through an electrochemical reaction, the electrical cell comprising:
   an anode;
   a cathode; and
   conductors for the supply of electrical current to an electrical load,
   wherein at least one of said anode and said cathode comprises a coal-based carbon foam having 7.45% (D/B) to 9.65% (D/B) ash, a density in the range of about 0.1 g/cm$^3$ to about 0.8 g/cm$^3$ and a pore size below about 2000 µm.

10. The electrical cell of claim 9, wherein said coal base carbon foam is produced from particulate coal have a diameter less than about 1 mm.

11. The electrical cell of claim 9, wherein said coal-based carbon foam has a compressive strength below about 6000 psi.

12. The electrical cell of claim 9, wherein said coal-based carbon foam exhibits a pore size below about 100 µm.

13. The electrical cell of claim 9, wherein said coal-based carbon foam has been graphitized at a temperature ranging from about 1600° C. to about 3000° C.

14. The electrical cell of claim 9, wherein said coal-based carbon foam has been graphitized at a temperature ranging from about 1800° C. to about 2200° C.

15. The electrical cell of claim 9, wherein said coal-based carbon foam is produced from bituminous coal.

16. The electrical cell of claim 9, wherein said carbon foam is prepared by a process comprising the steps of:
   comminuting coal to a small particle size to form a ground coal;
   placing said ground coal in a mold;
   heating said ground coal in said mold under a non-oxidizing atmosphere to a temperature of ranging from about 300° C. to about 700° C. to form an electrode preform; and
   graphitizing said electrode preform at a temperature ranging from about 1600° C. to about 3000° C.

* * * * *